US010332338B2

(12) United States Patent
Arnone et al.

(10) Patent No.: US 10,332,338 B2
(45) Date of Patent: Jun. 25, 2019

(54) MODULAR INTERACTIVE APPLICATION INTERLEAVED WAGERING SYSTEM

(71) Applicant: Gamblit Gaming, LLC, Glendale, CA (US)

(72) Inventors: Miles Arnone, Sherborn, MA (US); Frank Cire, Pasadena, CA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 122 days.

(21) Appl. No.: 15/098,313

(22) Filed: Apr. 13, 2016

(65) Prior Publication Data

US 2016/0300441 A1 Oct. 13, 2016

Related U.S. Application Data

(60) Provisional application No. 62/146,960, filed on Apr. 13, 2015.

(51) Int. Cl.
*A63F 13/00* (2014.01)
*G07F 17/32* (2006.01)

(52) U.S. Cl.
CPC ........ *G07F 17/3223* (2013.01); *G07F 17/326* (2013.01); *G07F 17/3206* (2013.01); *G07F 17/3244* (2013.01); *G07F 17/3262* (2013.01); *G07F 17/3267* (2013.01); *G07F 17/3295* (2013.01)

(58) Field of Classification Search
CPC ............. G07F 17/3244; G07F 17/3206; G07F 17/3223
See application file for complete search history.

(56) References Cited

U.S. PATENT DOCUMENTS

| | | | |
|---|---|---|---|
| 5,413,357 | A | 5/1995 | Schulze et al. |
| 5,718,429 | A | 2/1998 | Keller |
| 5,785,592 | A | 7/1998 | Jacobsen |
| 5,853,324 | A | 12/1998 | Kami et al. |

(Continued)

OTHER PUBLICATIONS

U.S. Appl. No. 14/185,847 Arnone, et al., filed Feb. 20, 2014.

(Continued)

*Primary Examiner* — Jason T Yen
(74) *Attorney, Agent, or Firm* — Caitlyn Ross; Frank Cire

(57) ABSTRACT

A modular interactive application interleaved wagering system is disclosed. Such a system includes an interactive controller constructed to generate a user interface of a wagering application, generate a user interface of an interactive application, combine the user interfaces into a combined user interface displayed to a user, detect user interactions with the combined user interface and communicate the user interactions to an application controller, receive from the application controller a wager outcome, and display to the user using the wagering user interface of the combined user interface, the wager outcome. The application controller operatively connects the interactive controller to a wager controller, wherein the application controller is constructed to receive from the interactive controller, the user interactions, detect a wagering event from the user interactions, determine the wager outcome responsive to the wagering event using the wager controller, and communicate the wager event to the interactive controller.

5 Claims, 17 Drawing Sheets

(56) References Cited

U.S. PATENT DOCUMENTS

| | | | | |
|---|---|---|---|---|
| 5,963,745 | A | 10/1999 | Collins et al. | |
| 6,050,895 | A | 4/2000 | Luciano | |
| 6,165,071 | A | 12/2000 | Weiss | |
| 6,227,974 | B1 | 5/2001 | Eilat | |
| 6,267,669 | B1* | 7/2001 | Luciano, Jr. | A63F 13/10 273/269 |
| 6,685,563 | B1 | 2/2004 | Meekins et al. | |
| 6,712,693 | B1 | 3/2004 | Hettinger | |
| 6,761,632 | B2 | 7/2004 | Bansemer et al. | |
| 6,761,633 | B2 | 7/2004 | Riendeau | |
| 6,764,397 | B1 | 7/2004 | Robb | |
| 6,811,482 | B2 | 11/2004 | Letovsky | |
| 7,118,105 | B2 | 10/2006 | Benevento | |
| 7,294,058 | B1 | 11/2007 | Slomiany | |
| 7,326,115 | B2 | 2/2008 | Baerlocher | |
| 7,361,091 | B2 | 4/2008 | Letovsky | |
| 7,517,282 | B1 | 4/2009 | Pryor | |
| 7,575,517 | B2 | 8/2009 | Parham et al. | |
| 7,682,239 | B2 | 3/2010 | Friedman et al. | |
| 7,720,733 | B2 | 5/2010 | Jung | |
| 7,753,770 | B2 | 7/2010 | Walker et al. | |
| 7,753,790 | B2 | 7/2010 | Nguyen | |
| 7,766,742 | B2 | 8/2010 | Bennett et al. | |
| 7,775,885 | B2 | 8/2010 | Van Luchene | |
| 7,798,896 | B2 | 9/2010 | Katz | |
| 7,828,657 | B2 | 11/2010 | Booth | |
| 7,917,371 | B2 | 3/2011 | Jung et al. | |
| 7,931,531 | B2 | 4/2011 | Oberberger | |
| 7,938,727 | B1 | 5/2011 | Konkle | |
| 7,950,993 | B2 | 5/2011 | Oberberger | |
| 7,967,674 | B2 | 6/2011 | Baerlocher | |
| 7,980,948 | B2 | 7/2011 | Rowe | |
| 7,996,264 | B2 | 8/2011 | Kusumoto et al. | |
| 8,012,023 | B2 | 9/2011 | Gates | |
| 8,047,908 | B2 | 11/2011 | Walker | |
| 8,047,915 | B2 | 11/2011 | Lyle | |
| 8,060,829 | B2 | 11/2011 | Jung et al. | |
| 8,075,383 | B2 | 12/2011 | Friedman et al. | |
| 8,087,999 | B2 | 1/2012 | Oberberger | |
| 8,113,938 | B2 | 2/2012 | Friedman et al. | |
| 8,118,654 | B1 | 2/2012 | Nicolas | |
| 8,128,487 | B2 | 3/2012 | Hamilton et al. | |
| 8,135,648 | B2 | 3/2012 | Oram | |
| 8,137,193 | B1 | 3/2012 | Kelly et al. | |
| 8,142,272 | B2 | 3/2012 | Walker | |
| 8,157,653 | B2 | 4/2012 | Buhr | |
| 8,167,699 | B2 | 5/2012 | Inamura | |
| 8,177,628 | B2 | 5/2012 | Manning | |
| 8,182,338 | B2 | 5/2012 | Thomas | |
| 8,182,339 | B2 | 5/2012 | Anderson | |
| 8,187,068 | B2 | 5/2012 | Slomiany | |
| 8,206,210 | B2 | 6/2012 | Walker | |
| 8,308,544 | B2 | 11/2012 | Friedman | |
| 8,430,735 | B2 | 4/2013 | Oberberger | |
| 8,475,266 | B2 | 7/2013 | Arnone | |
| 8,480,470 | B2 | 7/2013 | Napolitano et al. | |
| 8,622,809 | B1 | 1/2014 | Arora et al. | |
| 8,864,564 | B2 | 10/2014 | Oberberger | |
| 2001/0004609 | A1 | 6/2001 | Walker et al. | |
| 2001/0019965 | A1 | 9/2001 | Ochi | |
| 2002/0022509 | A1* | 2/2002 | Nicastro, II | G07F 17/32 463/15 |
| 2002/0090990 | A1 | 7/2002 | Joshi et al. | |
| 2002/0175471 | A1 | 11/2002 | Faith | |
| 2003/0060286 | A1 | 3/2003 | Walker et al. | |
| 2003/0119576 | A1 | 6/2003 | McClintic et al. | |
| 2003/0139214 | A1 | 7/2003 | Wolf et al. | |
| 2003/0171149 | A1 | 9/2003 | Rothschild | |
| 2003/0204565 | A1 | 10/2003 | Guo et al. | |
| 2003/0211879 | A1 | 11/2003 | Englman | |
| 2004/0092313 | A1 | 5/2004 | Saito et al. | |
| 2004/0097610 | A1 | 5/2004 | Saito | |
| 2004/0102238 | A1 | 5/2004 | Taylor | |
| 2004/0121839 | A1 | 6/2004 | Webb | |
| 2004/0204228 | A1* | 10/2004 | Walker | G07F 17/3244 463/20 |
| 2004/0225387 | A1 | 11/2004 | Smith | |
| 2005/0003878 | A1 | 1/2005 | Updike | |
| 2005/0096124 | A1 | 5/2005 | Stronach | |
| 2005/0116411 | A1 | 6/2005 | Herrmann et al. | |
| 2005/0192087 | A1 | 9/2005 | Friedman et al. | |
| 2005/0233791 | A1 | 10/2005 | Kane | |
| 2005/0233806 | A1 | 10/2005 | Kane et al. | |
| 2005/0239538 | A1 | 10/2005 | Dixon | |
| 2005/0269778 | A1 | 12/2005 | Samberg | |
| 2005/0288101 | A1 | 12/2005 | Lockton et al. | |
| 2006/0003823 | A1 | 1/2006 | Zhang | |
| 2006/0003830 | A1 | 1/2006 | Walker et al. | |
| 2006/0035696 | A1 | 2/2006 | Walker | |
| 2006/0040735 | A1 | 2/2006 | Baerlocher | |
| 2006/0068913 | A1 | 3/2006 | Walker et al. | |
| 2006/0084499 | A1 | 4/2006 | Moshal | |
| 2006/0084505 | A1 | 4/2006 | Yoseloff | |
| 2006/0135250 | A1 | 6/2006 | Rossides | |
| 2006/0154710 | A1 | 7/2006 | Serafat | |
| 2006/0166729 | A1 | 7/2006 | Saffari et al. | |
| 2006/0189371 | A1 | 8/2006 | Walker et al. | |
| 2006/0223611 | A1 | 10/2006 | Baerlocher | |
| 2006/0234791 | A1 | 10/2006 | Nguyen et al. | |
| 2006/0240890 | A1 | 10/2006 | Walker | |
| 2006/0246403 | A1 | 11/2006 | Monpouet et al. | |
| 2006/0258433 | A1 | 11/2006 | Finocchio et al. | |
| 2007/0026924 | A1 | 2/2007 | Taylor | |
| 2007/0035548 | A1 | 2/2007 | Jung et al. | |
| 2007/0038559 | A1 | 2/2007 | Jung et al. | |
| 2007/0064074 | A1 | 3/2007 | Silverbrook et al. | |
| 2007/0087799 | A1 | 4/2007 | Van Luchene | |
| 2007/0093299 | A1 | 4/2007 | Bergeron | |
| 2007/0099696 | A1 | 5/2007 | Nguyen et al. | |
| 2007/0117641 | A1 | 5/2007 | Walker et al. | |
| 2007/0129149 | A1 | 6/2007 | Walker | |
| 2007/0142108 | A1 | 6/2007 | Linard | |
| 2007/0156509 | A1 | 7/2007 | Jung et al. | |
| 2007/0167212 | A1 | 7/2007 | Nguyen | |
| 2007/0167239 | A1 | 7/2007 | O'Rourke | |
| 2007/0173311 | A1 | 7/2007 | Morrow et al. | |
| 2007/0191104 | A1 | 8/2007 | Van Luchene | |
| 2007/0202941 | A1 | 8/2007 | Miltenberger | |
| 2007/0203828 | A1 | 8/2007 | Jung et al. | |
| 2007/0207847 | A1 | 9/2007 | Thomas | |
| 2007/0259717 | A1 | 11/2007 | Mattice | |
| 2007/0293306 | A1 | 12/2007 | Nee et al. | |
| 2008/0004107 | A1 | 1/2008 | Nguyen et al. | |
| 2008/0014835 | A1 | 1/2008 | Weston et al. | |
| 2008/0015004 | A1 | 1/2008 | Gatto et al. | |
| 2008/0064488 | A1 | 3/2008 | Oh | |
| 2008/0070659 | A1 | 3/2008 | Naicker | |
| 2008/0070690 | A1 | 3/2008 | Van Luchene | |
| 2008/0070702 | A1 | 3/2008 | Kaminkow | |
| 2008/0096665 | A1 | 4/2008 | Cohen | |
| 2008/0108406 | A1 | 5/2008 | Oberberger | |
| 2008/0108425 | A1 | 5/2008 | Oberberger | |
| 2008/0113704 | A1 | 5/2008 | Jackson | |
| 2008/0119283 | A1 | 5/2008 | Baerlocher | |
| 2008/0146308 | A1 | 6/2008 | Okada | |
| 2008/0161081 | A1 | 7/2008 | Berman | |
| 2008/0176619 | A1 | 7/2008 | Kelly | |
| 2008/0191418 | A1 | 8/2008 | Lutnick et al. | |
| 2008/0195481 | A1 | 8/2008 | Lutnick | |
| 2008/0248850 | A1 | 10/2008 | Schugar | |
| 2008/0254893 | A1 | 10/2008 | Patel | |
| 2008/0274796 | A1 | 11/2008 | Lube | |
| 2008/0274798 | A1 | 11/2008 | Walker et al. | |
| 2008/0311980 | A1 | 12/2008 | Cannon | |
| 2008/0318668 | A1 | 12/2008 | Ching | |
| 2009/0011827 | A1 | 1/2009 | Englman | |
| 2009/0023489 | A1 | 1/2009 | Toneguzzo | |
| 2009/0023492 | A1 | 1/2009 | Erfanian | |
| 2009/0061974 | A1 | 3/2009 | Lutnick et al. | |
| 2009/0061975 | A1 | 3/2009 | Ditchev | |
| 2009/0061991 | A1 | 3/2009 | Popovich | |
| 2009/0061997 | A1 | 3/2009 | Popovich | |
| 2009/0061998 | A1 | 3/2009 | Popovich | |

(56) References Cited

U.S. PATENT DOCUMENTS

2009/0061999 A1 3/2009 Popovich
2009/0082093 A1 3/2009 Okada
2009/0088239 A1 4/2009 Iddings
2009/0098934 A1 4/2009 Amour
2009/0117961 A1* 5/2009 Bennett ............... G07F 17/3213 463/16
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0275393 A1 11/2009 Kisenwether
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1* 1/2010 Thomas .................. G07F 17/32 463/20
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0046094 A1* 2/2012 Shore .................. G07F 17/3288 463/25
2012/0058814 A1 3/2012 Lutnick
2012/0077569 A1 3/2012 Watkins
2012/0108323 A1 5/2012 Kelly
2012/0135793 A1 5/2012 Antonopoulos
2012/0202587 A1 8/2012 Allen
2012/0302311 A1 11/2012 Luciano
2012/0322545 A1 12/2012 Arnone et al.
2013/0029760 A1 1/2013 Wickett
2013/0131848 A1 5/2013 Arnone et al.
2013/0190074 A1 7/2013 Arnone et al.
2013/0203489 A1* 8/2013 Lyons ................. G07F 17/3225 463/30
2013/0260869 A1 10/2013 Leandro et al.
2014/0087801 A1 3/2014 Nicely et al.
2014/0087808 A1 3/2014 Leandro et al.
2014/0087809 A1 3/2014 Leupp et al.
2014/0228086 A1* 8/2014 Smith ................... G07F 17/326 463/7
2014/0357350 A1 12/2014 Weingardt et al.
2015/0087406 A1* 3/2015 Denham ............. G07F 17/3262 463/25

OTHER PUBLICATIONS

U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.

(56) References Cited

OTHER PUBLICATIONS

U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.

(56) References Cited

OTHER PUBLICATIONS

U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.

* cited by examiner

MODULAR INTERACTIVE APPLICATION INTERLEAVED WAGERING SYSTEM

CROSS REFERENCE TO RELATED APPLICATIONS

This application claims the benefit of U.S. Provisional Patent Application No. 62/146,960, filed Apr. 13, 2015 the contents of which are incorporated by reference herein in their entirety.

FIELD OF THE INVENTION

Embodiments of the present invention are generally related to communications within data processing systems. More particularly, the present invention relates to the communication and processing of wagering data.

BACKGROUND

The gaming industry has traditionally developed electronic gaming machines that present simple gambling games to a user. The communication and processing needs for these simple gambling games are easily met using conventional processing systems.

For example, U.S. Pat. No. 6,905,405 to McClintic describes a conventional computerized game provided with a central processor (CPU) operably coupled to input logic circuitry and output logic circuitry. The input logic circuitry is employed to operably couple CPU to input devices such as, for example, a touch screen segment or physical button, a coin acceptor, a bill acceptor, a player tracking card reader or a credit/debit card reader. The output logic circuitry is employed to operably couple the CPU with output devices such as, for example, a hopper, a video monitor, meter displays, and a printer. The CPU is also operably coupled to controlling software memory, which includes assigned memory locations storing game software and system software. Such controlling software memory dictates when selected graphics or messages are displayed to a player, as well as when play sequences begin and end and management of wager input and award output. The CPU is also operably coupled to a second memory, which is employed to store data indicative of game statistics, number of plays, number of wins, etc. Controlling software memory, a second memory, or other, ancillary memory store data indicative of winning results, such as data representative of one or more symbol combinations, including winning combinations. Second memory may also be used, for example, to store a bit map of the symbol pattern depicted as a matrix display on video monitor. In operation of the gaming device the CPU carries out instructions of the system software to implement an initial display pattern on the video monitor and to enable the input devices. After a wager is received a player activates an initiator element such as a handle, the physical button or the touch screen to initiate a play sequence. At this point, the game software, in conjunction with a random number generator, generates a random symbol configuration at for a random final outcome comprised of a pattern of symbols for depiction on video monitor. System software then animates the video monitor by simulating the movement of visible representations of symbol carriers including symbols thereon so that the player perceives symbol carrier rotational "movement" of each symbol carrier as well as, optionally, rotational movement of the entire group of symbol carriers about a common axis. Once the visible representations of the symbol carriers have stopped, all of the generated, displayed symbols comprising a winning combination or combinations in the matrix display are identified or flagged. The displayed results (pattern of symbols depicted on the video monitor, which may include symbols received from a remote location, is compared with data stored in game software representing winning combinations to determine if any displayed combination on an active pay line is a winning combination. Any identified winning combination or combinations of symbols are then associated with winnings to be distributed to the player according to a paytable of the game software associated with the various possible winning combinations. The various pay line configurations and required combinations of the various indicia for a winning combination within each pay line reside within the game software and are retrieved for comparison to the randomly generated pattern of indicia depicted on the video monitor.

Operation of another conventional computerized game is described in U.S. Pat. No. 6,409,602 issued to Wiltshire et al. A game program is executed on server/host computer. It is then determined whether an image is to be displayed on a screen of a client/terminal computer. If so, an image is sent from the server/host computer to client/terminal computer. The image may include any type of graphical information including a bitmap, a JPEG file, a TIFF file or even an encoded audio/video stream such as a compressed video MPEG stream. The image is generated by game computer program and passed to server/host interface program. In turn, the image is transferred over communication pathways to client/terminal computer via the network services provided by server operating system. The image is received by a client/terminal program executing on the client/terminal computer via the network services provided by client operating system. The client/terminal program then causes the image to be displayed on a screen of the client/terminal computer. It is then determined whether an input command has been entered by the patron using the client/terminal computer. The input command may be a keystroke, movement or clicking of the mouse, a voice activated command or even the clicking of a "virtual button" on a touch screen. The client/terminal program causes the input command to be transmitted back to server/host computer via communication pathways, again using network services provided by the client operating system on one end and server operating system on the other. The command is thus received by the server/host interface program, that, in turn, passes the command back to the game program. The game program processes the input command and updates the state of the game accordingly.

However, more complicated wagering processes need communication and processing systems that are better suited for implementing these more complicated wagering processes. Various aspects of embodiments of the invention meet such a need.

SUMMARY OF THE INVENTION

Systems and methods in accordance with embodiments of the invention provide a communication and data processing system constructed for a modular interactive application interleaved wagering system.

In an embodiment, a modular interactive application interleaved wagering system includes an interactive controller constructed to: generate a user interface of a wagering application; generate a user interface of an interactive application; combine the user interface of the wagering application and the user interface of the interactive application into a combined user interface displayed to a user; detect user interactions with the combined user interface and communicate the user interactions to an application controller; receive from the application controller a wager outcome; and display to the user using the wagering user interface of the combined user interface, the wager outcome. The application controller operatively connects the interactive controller to a wager controller, wherein the application controller is constructed to: receive from the interactive controller, the user interactions; detect a wagering event from the user interactions; determine the wager outcome responsive to the wagering event using the wager controller; and communicate the wager event to the interactive controller.

In some embodiments, the interactive controller and the application controller are constructed from the same device, and the application controller is operatively connected to the wager controller using a communication link.

In another embodiment, the wager controller and application controller are constructed from the same device, and the application controller is operatively connected to interactive controller using a communication link.

In some embodiments, the modular interactive application interleaved wagering system further includes an enclosure constructed to mount: a user input device operatively connected to the interactive controller; a user output device operatively connected to the interactive controller; a credit input device operatively connected to the wager controller; and a credit output device operatively connected to the wager controller.

In various embodiments, the modular interactive application interleaved wagering system further includes a random number generator, wherein the wager controller is further constructed to: communicate with the credit input device to receive a credit input, the credit input for wagering to determine the wager outcome; generate the wager outcome based on a random result generated by the random number generator; and update a credit meter based on the wager outcome.

In an embodiment of the invention, an application controller operates as an interface between an interactive controller that determines skill outcomes and a wager controller that determines wager outcomes. By virtue of this feature, the wager controller is isolated from the interactive controller allowing the interactive controller to operate in an unregulated environment while allowing the wager controller to operate in a regulated environment, thus providing for more efficient management of the operations of such a system.

In another embodiment of the invention, a single wager controller may provide services to two or more interactive controllers, thus allowing a modular interactive application wagering system to operate more efficiently over a large range of scaling.

In another embodiment of the invention, multiple types of interactive controllers using different operating systems may be interfaced to a single type of application controller without requiring customization of the application controller and/or the wager controller, thus improving the efficiency of the application controller and/or the wager controller by reducing complexity associated with maintaining separate application controllers and/or wager controllers for each type of interactive controller.

In another embodiment of the invention, an interactive controller may be provided as a user device under control of a user while maintaining the application controller in an environment under the control of a regulated operator of wagering equipment, thus providing for a more economical system as the regulated operator need not expend capital to purchase interactive controllers.

In another embodiment of the invention, data communicated between the controllers may be encrypted to increase security of the modular interactive application wagering system.

In another embodiment of the invention, an application controller isolates chance-based component logic and skill proposition logic as unregulated logic from a regulated wager controller, thus allowing errors in the skill proposition logic and/or chance-based component logic to be corrected, new skill proposition logic and/or chance-based component logic to be used, or modifications to be made to the skill proposition logic and/or chance-based component logic without a need for time-consuming regulatory approval.

In another embodiment of the invention, an interactive application may require extensive processing resources from an interactive controller leaving few processing resources for the functions performed by an application controller and/or a wager controller. By virtue of an architecture of some embodiments of the invention, processing loads may be distributed across multiple devices such that operations of the interactive controller may be dedicated to an interactive application and the processes of the application controller and/or wager controller are not burdened by the requirements of the interactive application.

In another embodiment of the invention, a modular interactive application wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like. In many such embodiments, one or more components of a modular interactive application wagering system are distributed in close proximity to each other and communicate using a local area network and/or a communication bus. In several embodiments, an interactive controller and an application controller of a modular interactive application wagering system are in a common location. In some embodiments, an application controller communicates with an external interactive controller. In various embodiments, these multiple controllers and sub-controllers can be constructed from or configured using a single device or a plurality of devices such that a modular interactive application wagering system is executed as a system in a virtualized space such as, but not limited to, where a wager controller and an application controller are large scale centralized servers and are operatively connected to distributed interactive controllers via a wide area network such as the Internet or a local area network. In such embodiments, the components of a modular interactive application wagering system may communicate using a networking protocol or other type of device-to-device communications protocol.

In another embodiment of the invention, an interactive controller is an interactive server acting as a host for managing head-to-head user interactions over a network of interactive sub-controllers connected to the interactive server using a communication link. The interactive server provides an environment where users can compete directly with one another and interact with other users.

DETAILED DESCRIPTION

Figure 1:
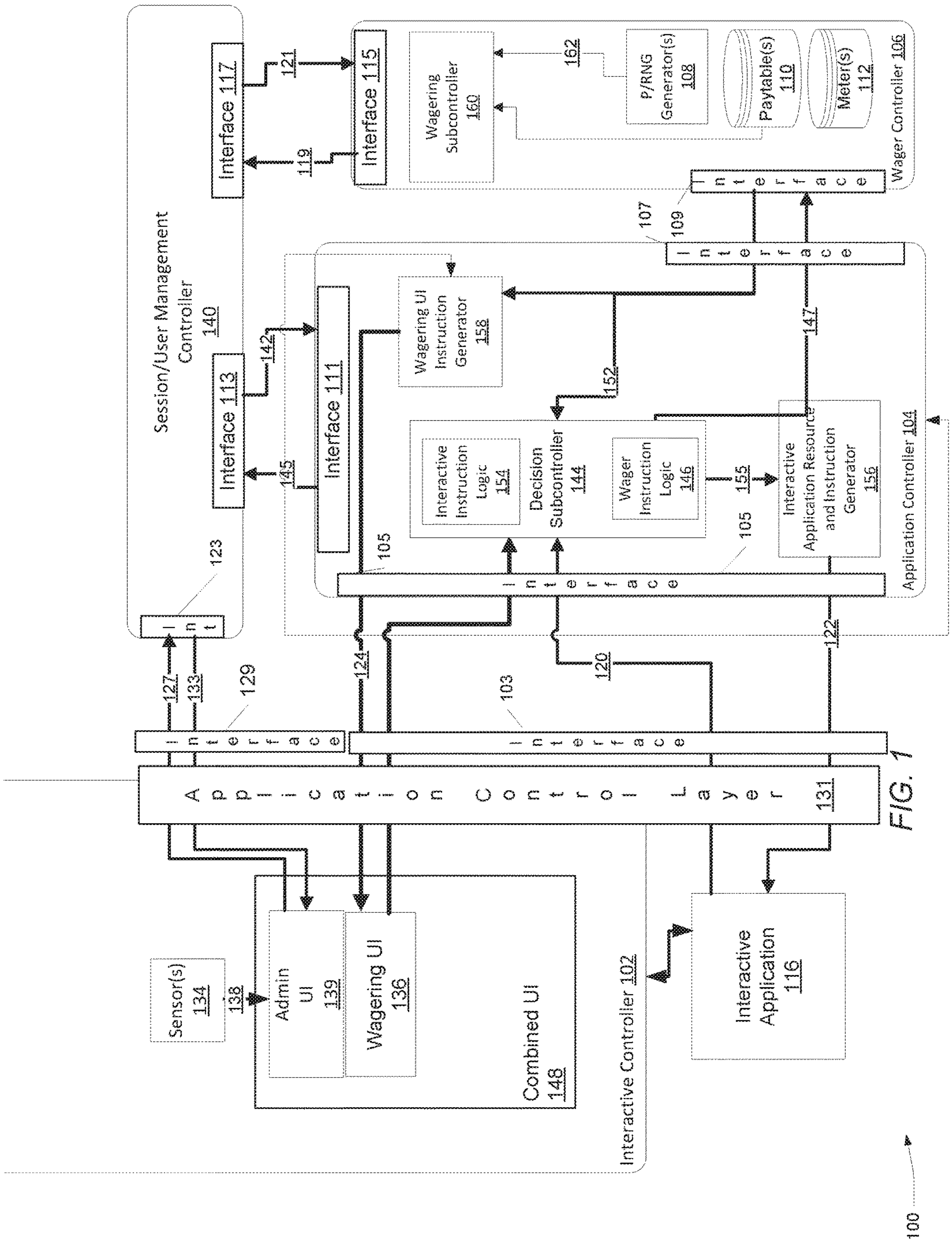
FIG. 1 is a diagram of a structure of a modular interactive application interleaved wagering system in accordance with various embodiments of the invention.

FIG. 1 is a diagram of a structure of a modular interactive application interleaved wagering system in accordance with various embodiments of the invention. A the modular interactive application interleaved wagering system 100 includes an the interactive controller 102, an the application controller 104, and a the wager controller 106. Components of the interactive controller 102 are operatively connected to, and communicate with, components of the application controller 104 using an interactive controller to application controller interface 103. Components of the application controller 104 are operatively connected to, and communicate with, components of the interactive controller 102 using the application controller to interactive controller interface 105. Components of the application controller 104 are operatively connected to, and communicate with, components of the wager controller 106 using an application controller to wager controller communication interface 107. Components of the wager controller 106 are operatively connected to, and communicate with components of the application controller 104, using a wager controller to application controller interface 109.

In some embodiments, components of the application controller 104 are operatively connected to, and communicate with, components of a session/user management controller 140 using an application controller to session/user management controller interface 111. In addition, components of the session/user management controller 140 are operatively connected to, and communicate with components of the application controller 104 using a session/user management controller to application controller interface 113.

The modular interactive application interleaved wagering system 100 interleaves wagering with non-wagering processes. In some embodiments of the modular interactive application interleaved wagering system 100, an the interactive application 116 executed by the interactive controller 102 provide non-wagering components of the modular interactive application interleaved wagering system 100. The interactive controller 102 is operatively connected to the application controller 104 and the application controller 104 instructs and configures the interactive application 116 of the interactive controller 102 and determines when wagers should be interleaved with the processes of the interactive application 116. The application controller 104 is further operatively connected to the wager controller 106 and the wager controller 106 provides one or more wagering propositions for one or more wagers.

In some embodiments, the interactive application 116 controls one or more interactive user interface(s) 126 that utilize user input and output devices of the interactive controller 102. A wagering application executed on the interactive controller 102 generates a wagering user interface 136 that is used to display data about a wagering process, including but not limited a wager outcome of a wager made in accordance with a wagering proposition. Content of the wagering user interface 136 is controlled by the application controller 104 and includes content provided by the wager controller 106. In many embodiments, the wagering application is included in an application control layer 131 of the interactive application 102.

In many embodiments, the wagering application is a component of the interactive application.

In several embodiments, a user, or the user's interactions with the interactive application 116, are represented in the modular interactive application interleaved wagering system 100 by an electronic representation of the interactions between the user and the interactive application 116, typically received via interactive user interface(s) 126 of the interactive application 116.

Many different types of interactive applications may be utilized with the modular interactive application interleaved wagering system 100. In some embodiments, the interactive application 116 reacts to the physical activity of the user. In these embodiments, the user interacts with the interactive application 116 through one or more sensors that monitor the user's physical activities and communicate sensor signals to the interactive application 116. Such sensors may include, but are not limited to, physiological sensors that monitor the physiology of the user, environmental sensors that monitor the physical environment of the location of the user, accelerometers that monitor changes in motion of the user, and location sensors 134 that monitor a location of the user such as global positioning sensors or the like.

In some embodiments, the interactive application 116 includes one or more skill-based interactive games that are played by the user.

In some embodiments, the interactive application 116 includes a tool used by the user to achieve some useful goal.

In operation, a user interacts with the interactive application 116 using various types of elements of the interactive application 116 in an interactive application environment. Elements are interactive application resources utilized by the user within the interactive application environment to provide an interactive experience for the user. Wagers of credits are made in accordance with a wagering proposition as triggered by the user's use of one or more of the elements of the interactive application 116. Wager outcomes of wagers of credits made in accordance with the wagering proposition can cause consumption, loss or accrual of credits.

In accordance with some embodiments, wager outcomes of wagering events can influence elements in the interactive application 116 such as, but not limited to, providing one or more new elements, restoring one or more consumed elements, causing the loss of one or more elements, and restoration or placement of one or more fixed elements.

In various embodiments, the wagers may be made using one or more credits (Cr).

In some embodiments, Cr can be one or more credits that are purchased using, and redeemed in, a real world currency having a real world value.

In many embodiments, Cr can be one or more credits in a virtual currency. Virtual currency is an alternate currency that can be acquired, purchased or transferred by or to a user, but does not necessarily directly correlate to a real world currency. In many such embodiments, Cr in a virtual currency are allowed to be purchased using a real world currency but are prevented from being redeemed in a real world currency having a real world value. In other such embodiments, Cr in a virtual currency is provided to the user without receiving compensation from the user, and the user may be able to exchange the Cr for value such as a physical item, services, or real world currency.

In several embodiments, during interaction with an interactive application using the elements, a user can optionally consume and/or accrue application credit (AC) within the interactive application as a result of the user's use of the interactive application 116. AC can be in the form of, but is not limited to, application credits, experience points, game world credit in an interactive game, and/or user points.

In various embodiments, when the interactive application 116 is a skill-based interactive game, AC is awarded to a player of the skill-based interactive game on the basis of the player's skillful play of the skill-based interactive game. In such embodiments, AC may be analogous to the score in a video game. The skill-based interactive game can have one or more scoring criteria, utilized by the application controller 104 and/or the interactive controller 102 that executes the skill-based interactive game, that reflect user performance against one or more goals of the skill-based interactive game.

In many embodiments, AC can be used to purchase in-application items, including but not limited to, application elements that have particular properties, power ups for existing items, and other item enhancements.

In some embodiments, AC may be used to earn entrance into a sweepstakes drawing, to earn entrance in a tournament with prizes, to score in the tournament, and/or to participate and/or score in a game event.

In several embodiments, AC can be stored on a user-tracking card or in a network-based user tracking system where the AC is attributed to a specific user.

In many embodiments, a wagering proposition includes a wager of AC for a wager outcome of a randomly generated payout of interactive application AC, elements, and/or objects in accordance with a wagering proposition.

In a number of embodiments, a wager of an amount of Cr results in a wager outcome of a payout of AC, elements, and/or objects that have a Cr value if exchanged for an amount of real world currency.

In some embodiments, in a case that the interactive application 116 is a skill-based interactive game, interactive application objects include in-application objects that may be used by a player of the skill-based interactive game to enhance the player's gameplay of the skill-based interactive game. Such objects include, but are not limited to, power-ups, enhanced in-application items, and the like. In some embodiments, interactive application objects include objects that are detrimental to the player's play of the skill-based interactive game such as, but not limited to, obstructions in the game space, a temporary player handicap, an enhanced opponent, and the like.

In some embodiments, elements in the interactive application 116 include, but are not limited to, enabling elements (EE) that are interactive application resources utilized during the user's use of the interactive application 116 and whose utilization by the user while using the interactive application 116 triggers execution of a wager in accordance with a wagering proposition. In many embodiments, elements in the interactive application 116 include, but are not limited to, a reserve enabling element (REE), that is an element that converts into one or more enabling elements upon occurrence of a release event during an interactive user session. In yet more embodiments, elements in the interactive application 116 include, but are not limited to, an actionable element (AE) that is an element that is acted upon during use of the interactive application 116 to trigger a wager in accordance with a wagering proposition and may or may not be restorable during normal play of the interactive application 116. In yet another embodiment, elements in the interactive application 116 include, but are not limited to, a common enabling element (CEE) that is an element that may be shared by two or more users and causes a wagering event and associated wager to be triggered in accordance with the wagering proposition when used by one of the users during use of the interactive application 116. In some embodiments, in progressing through the interactive application 116 use, a user can utilize elements during interactions with a controlled entity (CE). A CE is a character, entity, inanimate object, device or other object under control of a user.

In accordance with some embodiments of the modular interactive application interleaved wagering system 100, the triggering of the wagering event and/or wager can be dependent upon an interactive application environment variable such as, but not limited to, a required object (RO), a required environmental condition (REC), or a controlled entity characteristic (CEC). A RO is a specific interactive application object in the interactive application 116 acted upon for an AE to be completed. A non-limiting example of an RO is a specific key needed to open a door. An REC is an interactive application state present within the interactive application 116 for an AE to be completed. A non-limiting example of an REC is daylight whose presence enables a character to walk through woods. A CEC is a status of the CE within the interactive application 116 for an AE to be completed. A non-limiting example of a CEC is requirement that a CE have full health points before entering battle. Although various interactive application resources such as, but not limited to, the types of interactive application elements as discussed herein may be used to trigger a wager in accordance with a wagering proposition, one skilled in the art will recognize that any interactive application resource can be utilized in a modular interactive application interleaved wagering system to trigger a wager as appropriate to the specification of a specific application in accordance with various embodiments of the invention.

In several embodiments, the modular interactive application interleaved wagering system 100 can utilize the application controller 104 to monitor use of the interactive application 116 executing on the interactive controller 102 for detection of a wagering event. When the application controller 104 detects a wagering event, the application controller 104 generates a trigger in accordance with at least one wagering event occurrence rule. The trigger of the wagering event can be communicated by the application controller 104 to the wager controller 106. In response to receiving the trigger, the wager controller 106 executes a wager in accordance with a wagering proposition. In addition, use of the interactive application 116 in the modular interactive application interleaved wagering system 100 can be modified by the application controller 104 based upon a wager outcome of the wager as executed by the wager controller 106.

In many embodiments, a wagering event occurrence can be detected by the application controller 104 by scanning interactive application telemetry data 120 communicated by the interactive controller 102 to the application controller 104.

In several embodiments, a wagering event occurrence can be detected from a value of one or more application environment variables within the interactive application 116 that are used to generate a trigger a wager and/or associated wager in accordance with a wagering proposition. Application environment variables can include, but are not limited to, passage of a period of time during the interactive application 116 use, a result from a modular interactive application interleaved wagering system interactive application user session (such as, but not limited to, achieving a goal or a particular score), a user action that is a consumption of an element, or a user action that achieves a combination of elements to be associated with a user profile.

In numerous embodiments, an interactive application instruction is an instruction to the interactive controller 102 and/or the interactive application 116 to modify the interactive application 116 application state or modify one or more interactive application resources of the interactive application 116. In some embodiments, one or more interactive application instructions may be generated by the application controller 104 based upon one or more of a wager outcome and application environment variables. An interactive application instruction can modify any aspect of the interactive application 116, such as, but not limited to, an addition of a period of time available for a current interactive application user session for interactive application of modular interactive application interleaved wagering system, an addition of a period of time available for a future modular interactive application interleaved wagering system interactive application user session or any other modification to interactive application elements that can be utilized during the interactive application 116 use. In some embodiments, an interactive application instruction can modify a type of element whose consumption triggers a wagering event occurrence. In many embodiments, an interactive application instruction can modify a type of element whose consumption is not required in a wagering event occurrence.

In some embodiments, a modular interactive application interleaved wagering system including an application controller operatively connected to a wager controller and operatively connected to an interactive controller may provide for interleaving wagering outcomes into entertainment content of an interactive application. The modular interactive application interleaved wagering system provides for random wager outcomes in accordance with a wagering proposition that are independent of user skill while providing an interactive experience to the user that may be shaped by the user's skill.

In several embodiments, the application controller 104 may provide for a communications interface for asynchronous communications between the wager controller 106 and the interactive application 116 executing on the interactive controller 102, by operatively connecting the interactive controller 102, and thus interactive controller's 102 the interactive application 116, with the wager controller 106. In some embodiments, asynchronous communications provided for by the modular interactive application interleaved wagering system 100 may reduce an amount of idle waiting time by the interactive controller 102, thus increasing an amount of processing resources that the interactive controller 102 may provide to the interactive application 116 or other processes of the interactive controller 102. In many embodiments, asynchronous communications provided for by the modular interactive application interleaved wagering system 100 reduces an amount of idle waiting time by the wager controller 106, thus increasing an amount of processing resources that the wager controller 106 may provide to execution of wagers to determine wager outcomes, and other processes provided by the wager controller 106. In some embodiments, the wager controller 106 may be operatively connected to a plurality of interactive controllers through one or more application controllers and the asynchronous communications provided for by the one or more application controllers allows the wager controller 106 to operate more efficiently and provide wager outcomes to a larger number of interactive controllers than would be achievable without the one or more application controllers.

In some embodiments, a modular interactive application interleaved wagering system including an application controller operatively connected to a wager controller and operatively connected to an interactive controller may provide for simplified communication protocols for communications of the interactive controller as the interactive controller may communicate user interactions with the interactive application executing one the interactive controller to the application controller without regard to a nature of a wagering proposition to be interleaved with processes of the interactive application.

In various embodiments, a modular interactive application interleaved wagering system including an application controller operatively connected to a wager controller and operatively connected to an interactive controller may provide for simplified communication protocols for communications of the wager controller as the wager controller 106 may receive wager requests, execute wagers, and communicate wager outcomes without regard to a nature of the interactive application provided by the interactive controller.

In several embodiments, a wager controller is a controller for providing one or more wagering propositions provided by a modular interactive application interleaved wagering system and executes wagers in accordance with the wagering propositions. Types of value wagered can be one or more of several different types. Types of value of a wager can include, but are not limited to, a wager of an amount of Cr corresponding to a real currency or a virtual currency, a wager of an amount of AC earned by a user through use of an interactive application, a wager of an amount of elements of the interactive application, and a wager of an amount of objects used in the interactive application. A wager outcome determined for a wager in accordance with a wagering proposition can increase or decrease an amount of the type of value used in the wager, such as, but not limited to, increasing an amount of Cr for a wager of Cr. In various embodiments, a wager outcome determined for a wager in accordance with a wagering proposition can increase or decrease an amount of a type of value that is different than a type of value of the wager, such as, but not limited to, increasing an amount of an object of an interactive application for a wager of Cr.

In many embodiments, the wager controller 106 includes one or more pseudo random or random number generators (P/RNG) 108 for generating random results, one or more paytables 110 for determining a wager outcome from the random results, and one or more credit or value meters 112 for storing amounts of wagered and won credits. In operation, the wager controller 106 receives wager instruction data 147 from the application controller 104 via interfaces 107 and 109. The wager controller uses a wagering subcontroller 150 to execute a wager. The wagering subcontroller debits credits from a meter of the one or more meters 112, reads a pseudo random or random number from the one or more P/RNGs 108, reads a paytable from the one or more paytables 110, determines a wagering outcome using the pseudo random or random number and the paytable, The P/RNG generator(s) 108 execute processes that generate random or pseudo random results. The paytable(s) 110 are tables used in conjunction with the random or pseudo random results to determine a wager outcome including an amount of Cr, AC, elements or objects won as a function of modular interactive application interleaved wagering system use. There can be one or more paytables 110 in the wager controller 106. The paytable(s) 110 are used to implement one or more wagering propositions in conjunction with a random output of the P/RNG generator(s) 108. In some embodiments, selection of a paytable to use to execute a wager can be based on factors including, but not limited to, interactive application progress a user has achieved through use of an interactive application, user identification, and eligibility of the user for bonus rounds.

In various embodiments, the interactive controller 102 provides an execution environment for a wagering application and the one or more interactive applications 116. The interactive controller 102 also provides user input devices (such as, but not limited to, keypads, keyboards, touchscreens, motion sensors, and the like) and output devices (such as, but not limited to, audio output devices, video screens, actuators, and the like) for interacting with a user. The interactive controller 102 provides for user interactions with the interactive application 116 and the wagering application by receiving input from a user through the user input devices and providing outputs using the user output devices.

The interactive controller 102 is operatively connected to, and communicates with, the application controller 104. The interactive controller 102 communicates, using interactive controller to application controller interface 103, application telemetry data 120 to the application controller 104, and receives, using interactive controller to application controller interface 103, interactive application instruction and resource data 122 from the application controller 104.

The interactive controller 102 also receives, using interactive controller to application controller interface 103, wagering application instruction and resource data 124 from the application controller 104. Through the communication of application instructions and resources 122 and 124, the application controller 104 can communicate certain application resources including control parameters to a wagering application controlling wagering user interface 136 and the interactive application 116 to affect wagering application and interactive application execution within an execution environment provided by the interactive controller 102.

In some embodiments, the interactive application 116 generates and utilizes one or more respective interactive user interface(s) 126 for presentation to a user using user input and user output devices 118. Interactive user interface(s) 126 may include audio features, visual features or tactile features, or any combination of these features. Interactive user interface(s) 126 further include one or more human input devices interfaces that communicate with one or more human input devices that a user can use to interact with the interactive application 116. Interactive application telemetry data 120 are communicated by the interactive application 116 to the application controller 104.

In some embodiments, an administrative application utilizes location signals 138 received from location sensor(s) 134 to determine location data of the interactive controller 102, and thus the user. Such location data may be communicated by the administrative application to the application controller 104 as administrative telemetry data 127 communicated to the session/user management controller 140 via interactive controller to session/user management controller interface 129 and session/user management controller to interactive controller interface 123. In various embodiments, the administrative application receives from a user, using the administrative user interface 139, user and session administrative data for configuring a user profile and a session, respectively. The user and session administrative data is communicated by the interactive controller 102 to the session/user management controller 140 as part of the administrative telemetry data 127 via interfaces 129 and 123. The session/user management controller 140 in turn generates session control data 133 that is communicated to the interactive controller 102 and used by the administrative application to configure the interactive controller 102 and/or the execution of the interactive application 116. In many embodiments, the administrative application is included in the application control layer 131 of the interactive controller 102.

In various embodiments, an administrative application functions as a browser client and communicates with a session/user management controller using an Internet protocol.

In some embodiments, execution of the interactive application 116 by the interactive controller 102 communicates user interactions with the interactive application 116 to the application controller 104 as part of application telemetry data 120. The user interactions include, but are not limited to, the user's utilization of the elements in the interactive application 116.

In some embodiments, the interactive application 116 is a skill-based interactive game. In such embodiments, execution of the skill-based interactive game by the interactive controller 102 is based on the user's skillful play of the skill-based interactive game. The interactive controller 102 can also communicate user choices made in the skill-based interactive game to the application controller 104 included in the application telemetry data 120 such as, but not limited to, the user's utilization of the elements of the skill-based interactive game during the user's skillful play of the skill-based interactive game. In such an embodiment, application controller 102 is interfaced to the interactive controller 102 in order to allow the coupling of the skill-based interactive game to wagers made in accordance with a wagering proposition.

In some embodiments, the interactive controller 102 includes one or more sensors 134 that sense various aspects of the physical environment of the interactive controller 102. Examples of sensors include, but are not limited to: global positioning sensors (GPSs) for sensing communications from a GPS system to determine a position or location of the interactive controller 102; temperature sensors; accelerometers; pressure sensors; and the like. Sensor telemetry data 138 may be communicated by the interactive controller 102 to the application controller 104 as part of application telemetry data 120 or administrative telemetry data 127. The application controller 104 receives the sensor telemetry data 138 from the interactive controller and can and use the sensor telemetry data 138 to make wagering decisions.

In many embodiments, the application controller 104 provides an interface between the interactive application 116 executing on the interactive controller 102 and a wagering proposition provided by the wager controller 106.

In some embodiments, the application controller 104 includes an application controller to session/user management controller interface 111 to the session/user management controller 140, and the session/user management controller 140 includes a session/user management controller to application controller interface 113, for communication of data between the application controller 104 and the session/user management controller 140, including but not limited to session control data 142 from session/user management controller 140 to the application controller 104 and session telemetry data 145 from the application controller 104 to session/user management controller 140.

The application controller 104 includes a rule-based decision subcontroller 144 that receives telemetry data, such as application telemetry data 120 and sensor telemetry data 138 included in application telemetry data 120, from the interactive controller 102. The rule-based decision subcontroller 144 uses the telemetry data, along with wager instruction logic 146, to determine whether or not to trigger a wager and generates wager instruction data 147. The application controller 104 communicates, using the application controller to wager controller communication interface 107, the wager instruction data 147 to the wager controller 106 to instruct the wager controller 106 to execute a wager. The wager controller 106 receives, using the wager controller to application controller interface 109, the wager execution instruction data 147 and executes a wager in accordance with wager execution instructions included in the wager execution instruction data 147.

In some embodiments, the application telemetry data 120 includes, but is not limited to, application environment variable data that indicates a state of the interactive application 116 executed by the interactive controller 102, interactive controller data indicating a state of the interactive controller 102, and interaction data of interactions between a user and the interactive application 116 executing on the interactive controller 102. Wager execution instruction data 147 may include, but are not limited to, an amount and type of a wager, a trigger of the wager, and a selection of a paytable 108 to be used when executing the wager.

In some embodiments, the wager controller 106 communicates, using interface 109, wager outcome data 152 to the application controller 104. The application controller 104 receives wager outcome data 152 using interface 107, and the rule-based decision subcontroller 144 uses the wager outcome data 152, in conjunction with the telemetry data 120 and the interactive instruction logic 154, to determine interactive application instructions and interactive application resources to be provided to the interactive application 116 and generate interactive application instruction and interactive application resource decision data 155 that is communicated to an interactive application resource and instruction generator 156. The interactive application resource and instruction generator 156 uses the interactive application instruction and interactive application resource decision data 155 to generate interactive application instruction and resource data 122 for the management of the interactive application 116. The application controller 104 communicates, using interface 105, the interactive application instruction and resource data 122 to the interactive controller 102.

In some embodiments, wager outcome data 152 includes game state data about execution of a gambling game that underlies a wagering proposition, including but not limited to a final state, an intermediate state and/or a beginning state of the gambling game. For example: in a gambling game that is a slot math-based game, the final state of the gambling game may be final reel positions, an intermediate state may include spinning reels, and a beginning state may be an initial reel positions; in a gambling game that is a roulette wheel-based game, the final state may be a pocket of a roulette wheel where a ball may have come to rest, an intermediate state may be that the ball is circling a spinning roulette wheel, and a beginning state may be a spinning roulette wheel; in a gambling game that is a card-based game, the beginning, intermediate and final states may represent a sequence of play of cards, etc.

In many embodiments, the application controller 104 includes a pseudo random or random result generator used to generate random results that are communicated to application resource generator 156. Application resource generator 156 uses the random results to generate the application instruction and application resource data 122 used by the application controller 104 to instruct the interactive application 116.

In various embodiments, the rule-based decision subcontroller 144 also determines an amount of AC to award to a user based at least in part on the user's use of the interactive application 116 as determined from application telemetry data 120. In some embodiments, the wager outcome data 152 may also be used to determine an amount of AC that should be awarded to a user.

In numerous embodiments, the interactive application 116 is a skill-based interactive game and AC is awarded to the user for the user's skillful play of the skill-based interactive game.

In some embodiments, the wager outcome data 152 are communicated to a wagering user interface instruction generator 158. The wagering user interface instruction generator 158 receives the wager outcome data 152 and generates wagering application instruction and resource data 124. The wagering application instruction and resource data 124 are communicated by the application controller 104 to the interactive controller 102, using interface 105.

A wagering application receives, using interface 103, the wagering application instruction and resource data 124. The wagering application uses the wagering application instruction and resource data 124 to generate the wagering user interface 136 that describes a state of wagering and credit accumulation and loss for the modular interactive application interleaved wagering system 100. In some embodiments, the wagering application instruction and resource data 124 may include, but are not limited to, amounts of AC and interactive application elements earned, lost or accumulated by the user through use of the interactive application 116 as determined from a user's interactions with the interactive application 116, and Cr amounts won, lost or accumulated as determined from wager outcome data 152 and one or more meters 112.

In some embodiments, wager outcome data 152 also includes game state data of a gambling game executed in accordance with a wagering proposition by the wager controller 106. In various such embodiments, wagering user interface instruction generator 158 generates gambling game process display data and/or gambling game state display data using the game state data of the gambling game. The gambling game process display data and/or gambling game state display data is included in the wagering application instruction and resource data 124 that is communicated to the interactive controller 102. The gambling game process display data and/or a gambling game state display data is displayed in the wagering user interface 136 to a user by the wagering application.

In many applications, the administrative user interface 139, the wagering user interface 136 and interactive user interface 126 are included in a combined user interface 148 of the interactive controller 102.

The application controller 104 can further operatively connect, using interfaces 107 and 109, with the wager controller 106 and request wagering data from the wager controller 106. The wagering data may include, but is not limited to, an amount of Cr available for wagering in meter(s) 112, and one or more of paytable(s) 110 corresponding to one or more wagering propositions. The wager instruction generator 148 may use the wagering data when generating wager instruction data 147 to affect a wagering proposition of the wager controller 106. Such an affect can include, but is not limited to, affecting an amount of Cr in play for participation in wagering events of a gambling game provided by the wager controller 106, selecting a paytable to use in the wagering proposition, etc. The application controller 104 may additionally include various audit logs and activity meters.

In some embodiments, the wager controller 106 can also couple, using interface 115 and interface 117, to the session/user management controller 140 to exchange session telemetry data 119 and session control data 121, related to a user and activities of the user during the user's use of the modular interactive application interleaved wagering system 100.

In many embodiments, one or more users can be engaged in using the interactive application 116 executed by the interactive controller 102. In various embodiments, a modular interactive application interleaved wagering system can include an interactive application that provides a skill-based interactive game that includes head-to-head play between a single user and a computing device, between two or more users against one another, or multiple users playing against a computer device and/or each other. In some embodiments, the interactive application 116 can be a skill-based interactive game where the user is not skillfully playing against the computer or any other user such as skill-based interactive games where the user is effectively skillfully playing against himself or herself.

In some embodiments, the operation of the application controller 104 does not affect the provision of a wagering proposition by the wager controller 106 except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In various embodiments, wager outcome data 152 communicated from the wager controller 106 can also be used to convey a status operation of the wager controller 106.

In a number of embodiments, communication of wager instruction data 147 between the wager controller 106 and the application controller 104 can further be used to communicate various wagering control factors that the wager controller 106 uses as input. Examples of wagering control factors include, but are not limited to, an amount of Cr, AC, elements, or objects consumed per wagering event, and/or the user's election to enter a jackpot round.

In some embodiments, the application controller 104 utilizes wagering user interface instruction generator 158 to generate wagering user interface instruction data 124 for communication to, and use by, a wagering application to display interactive application data to a user, including but not limited to, club points, user status, control of the selection of choices, and messages which a user may find useful in order to adjust interactive application experience.

In some embodiments, the application controller 104 utilizes wagering user interface instruction generator 158 to generate wagering user interface instruction data 124 for communication to, and use by, a wagering application to display aspects of a wagering proposition to a user including, but not limited to, odds of certain wager outcomes, an amount of Cr, AC, interactive application elements or objects in play, and amounts of Cr, AC, interactive application elements or objects available.

In a number of embodiments, the wager controller 106 can accept wager proposition factor data from the application controller 104 using interface 107 and interface 109. The wager proposition factor data may include, but is not limited to, modifications in an amount of Cr, AC, interactive application elements or objects wagered on each individual wagering event, a number of wagering events per minute the wager controller 106 can resolve, entrance into a bonus round, and other factors. An example of a varying wager amount that a user can choose can include, but is not limited to, using a more difficult interactive application level associated with an amount of a wager. These factors can increase or decrease an amount wagered per individual wagering proposition in the same manner that a standard slot machine player can decide to wager more or less credits for each pull of the handle.

In several embodiments, the wager controller 106 can communicate a number of factors back and forth to the application controller 104, via interfaces 107 and 109, such that an increase/decrease in a wagered amount can be related to the change in user profile of a user of the interactive application 116. In this manner, a user can control a wager amount per wagering event in accordance with a wagering proposition with a change in mapping to a parameter or component that is applicable to an interactive application experience.

In some embodiments, the session/user management controller 140 is used to authorize a modular interactive application interleaved wagering system user session. The session/user management controller receives, using interface 111 and interface 113, session telemetry data 145, that may include, but is not limited to, user, interactive controller, application controller and wager controller data from the application controller 104. The session/user management controller 140 uses the user, interactive controller, application controller and wager controller data to regulate a modular interactive application interleaved wagering system user session. In some embodiments, session/user management controller 140 may also assert control of a modular interactive application interleaved wagering system game user session using session control data 142. Such control data may include, but is not limited to, instructions to end a user session, instructions to initiate wagering in a user session, instructions to end wagering during a user session but not ending a user's use of the interactive application 116, and instructions to change wagering from real credit wagering to virtual credit wagering, or vice versa.

In many embodiments, the session/user management controller 140 manages user profiles for a plurality of users. The session/user management controller 140 stores and manages data about users in order to provide authentication and authorization of users of the modular interactive application interleaved wagering system 100. In some embodiments, the session/user management controller 140 also manages geolocation information to ensure that the modular interactive application interleaved wagering system 100 is only used by users in jurisdictions were gaming is approved. In various embodiments, the session/user management controller 140 stores application credits that are associated with the user's use of interactive application of the modular interactive application interleaved wagering system 100.

In various embodiments, an application controller operates as an interface between an interactive controller and a wager controller. By virtue of this construction, the wager controller is isolated from the interactive controller allowing the interactive controller to operate in an unregulated environment while allowing the wager controller to operate in a regulated environment.

In some embodiments, a single wager controller may provide services to two or more interactive controllers and/or two or more application controllers, thus allowing a modular interactive application interleaved wagering system to operate over a large range of scaling.

In various embodiments, multiple types of interactive controllers using different operating systems may be interfaced to a single type of application controller and/or wager controller without requiring customization of application controller and/or the wager controller.

In many embodiments, an interactive controller may be provided as a user device under control of a user while maintaining the wager controller in an environment under the control of a regulated operator of wagering equipment.

In several embodiments, data communicated between the controllers may be encrypted to increase security of the modular interactive application interleaved wagering system.

In some embodiments, an application controller isolates trigger logic and application logic as unregulated logic from a regulated wager controller, thus allowing errors in the application logic and/or trigger logic to be corrected, new application logic and/or trigger logic to be used, or modifications to be made to the application logic and/or trigger logic without a need for regulatory approval.

In various embodiments, an interactive application may require extensive processing resources from an interactive controller leaving few processing resources for the functions performed by an application controller and/or a wager controller. By virtue of the architecture described herein, processing loads may be distributed across multiple devices such that operations of interactive controller may be dedicated to interactive application and the processes of application controller and/or wager controller are not burdened by the requirements of interactive application.

In many embodiments, a modular interactive application interleaved wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like.

In some embodiments, one or more components of a modular interactive application interleaved wagering system are distributed in close proximity to each other and communicate using a local area network and/or a communication bus. In several embodiments, an interactive controller and an application controller of a modular interactive application interleaved wagering system are in a common location and communicate with an external wager controller. In some embodiments, an application controller and a wager controller of a modular interactive application interleaved wagering system are in a common location and communicate with an external interactive controller. In many embodiments, an interactive controller, an application controller, and a wager controller of a modular interactive application interleaved wagering system are located in a common location. In some embodiments, a session/user management controller is located in a common location with an application controller and/or a wager controller.

In various embodiments, multiple devices of a modular interactive application interleaved wagering system can be constructed from or configured using a single server or a plurality of servers such that a modular interactive application interleaved wagering system is executed as a system in a virtualized space such as, but not limited to, where a wager controller and an application controller are large scale centralized servers in the cloud operatively connected to widely distributed interactive controllers via a wide area network such as the Internet or a local area network. In such embodiments, the components of a modular interactive application interleaved wagering system may communicate using a networking protocol or other type of device-to-device communications protocol.

In many embodiments, a centralized wager controller is operatively connected to, and communicates with, one or more application controllers using a communication link. The centralized wager controller can generate wager outcomes for wagers in accordance with one or more wagering propositions. The centralized wager controller can execute a number of simultaneous or pseudo-simultaneous wagers in order to generate wager outcomes for a variety of wagering propositions that one or more distributed modular interactive application interleaved wagering systems can use.

In several embodiments, a centralized application controller is operatively connected to one or more interactive controllers and one or more wager controllers using a communication link. The centralized application controller can perform the functionality of an application controller across various modular interactive application interleaved wagering systems.

In a variety of embodiments, management of user profile data can be performed by a session/user management controller operatively connected to, and communicating with, one or more application controllers, wager controllers and interactive controllers using a communication link. A session/user management controller can manage data related to a user profile. The managed data in the user profile may include, but is not limited to, data concerning controlled entities (characters) in interactive application use, user performance metrics for a type or class of interactive application, interactive application elements acquired by a user; Cr and AC associated with a particular user, and tournament reservations.

Although a session/user management controller is discussed as being separate from an application controller server, a centralized application controller server may also perform the functions of a session/user management controller in some embodiments.

In numerous embodiments, an interactive application server provides a host for managing head-to-head play operating over a network of interactive controllers connected to interactive application server using a communication link. Such an interactive application server provides an environment where users can compete directly with one another and interact with other users.

Processing devices connected using a communication link to construct modular interactive application interleaved wagering systems in accordance with many embodiments of the invention can communicate with each other to provide services utilized by a modular interactive application interleaved wagering system. In several embodiments, a wager controller can communicate with an application controller using a communication link. In some embodiments, the wager controller can communicate with an application controller to communicate any type of data as appropriate for a specific application. Examples of the data that may be communicated include, but are not limited to, data used to configure the various simultaneous or pseudo simultaneous wager controllers executing in parallel within the wager controller to accomplish modular interactive application interleaved wagering system functionalities; data used to determine metrics of wager controller performance such as wagers run and/or wager outcomes for tracking system performance; data used to perform audits and/or provide operator reports; and data used to request the results of a wager outcome for use in one or more function(s) operating within application controller such as, but not limited to, automatic drawings for prizes that are a function of interactive controller performance.

In several embodiments, an application controller can communicate with an interactive application server using a communication link when interactive application server is also communicating with one or more interactive controllers using a communication link. An application controller can communicate with an interactive application server to communicate any type of data as appropriate for a specific application. The data that may be communicated between an application controller and an interactive application server includes, but is not limited to, the data for management of an interactive application server by an application controller server during a modular interactive application interleaved wagering system tournament. In an example embodiment, an application controller may not be aware of the relationship of application controller to the rest of a tournament since the actual tournament play may be managed by interactive application server. Therefore, management of a modular interactive application interleaved wagering system can include, but is not limited to tasks including, but not limited to, conducting tournaments according to system programming that can be coordinated by an operator of the modular interactive application interleaved wagering system; allowing entry of a particular user into a tournament; communicating the number of users in a tournament; and the status of the tournament (such as, but not limited to the amount of surviving users, the status of each surviving user within the game, and time remaining on the tournament); communicating the performance of users within the tournament; communicating the scores of the various users in the tournament; and providing a synchronizing link to connect application controllers in a tournament with their respective interactive controllers.

In several embodiments, an application controller can communicate with a session/user management controller using a communication link. An application controller can communicate with a session/user management controller to communicate any type of data as appropriate for a specific application. Examples of data communicated between an application controller and a session/user management controller include, but are not limited to, data for configuring tournaments according to system programming conducted by an operator of a modular interactive application interleaved wagering system; data for exchange of data used to link a user's user profile to an ability to participate in various forms of modular interactive application interleaved wagering system use (such as but not limited to the difficulty of play set by application controller server for an interactive application that is a skill-based interactive game); data for determining a user's ability to participate in a tournament as a function of a user's characteristics (such as but not limited to a user's prowess or other metrics used for tournament screening); data for configuring application controller and interactive controller performance to suit preferences of a user on a particular modular interactive application interleaved wagering system; and data for determining a user's use and wagering performance for the purposes of marketing intelligence; and data for logging secondary drawing awards, tournament prizes, Cr and/or AC into the user profile.

In many embodiments, a modular interactive application interleaved wagering system can be distributed across one or more processing devices, with the actual location of where various process are executed being located either on an end device (session/user management controller, wager controller, application controller, interactive controller), on servers (session/user management controller, wager controller, application controller, or interactive application server), or a combination of both end devices and servers. In a number of embodiments, certain functions of a wager controller, application controller, and/or interactive application server can operate on a local wager controller, local application controller and/or local interactive controller used to construct a modular interactive application interleaved wagering system being provided locally on a device. In some embodiments, a controller or server can be part of a server system including multiple servers, where applications can be run on one or more physical devices. Similarly, in particular embodiments, multiple servers can be combined on a single physical device.

In many embodiments, a modular interactive application interleaved wagering system can be distributed across one or more processing devices that are in close proximity to each other, such as a common enclosure. In such an embodiment, the one or more processing devices can be operatively connected using communication links that incorporate an interdevice communication protocol over a serial or parallel physical link.

Figure 2:
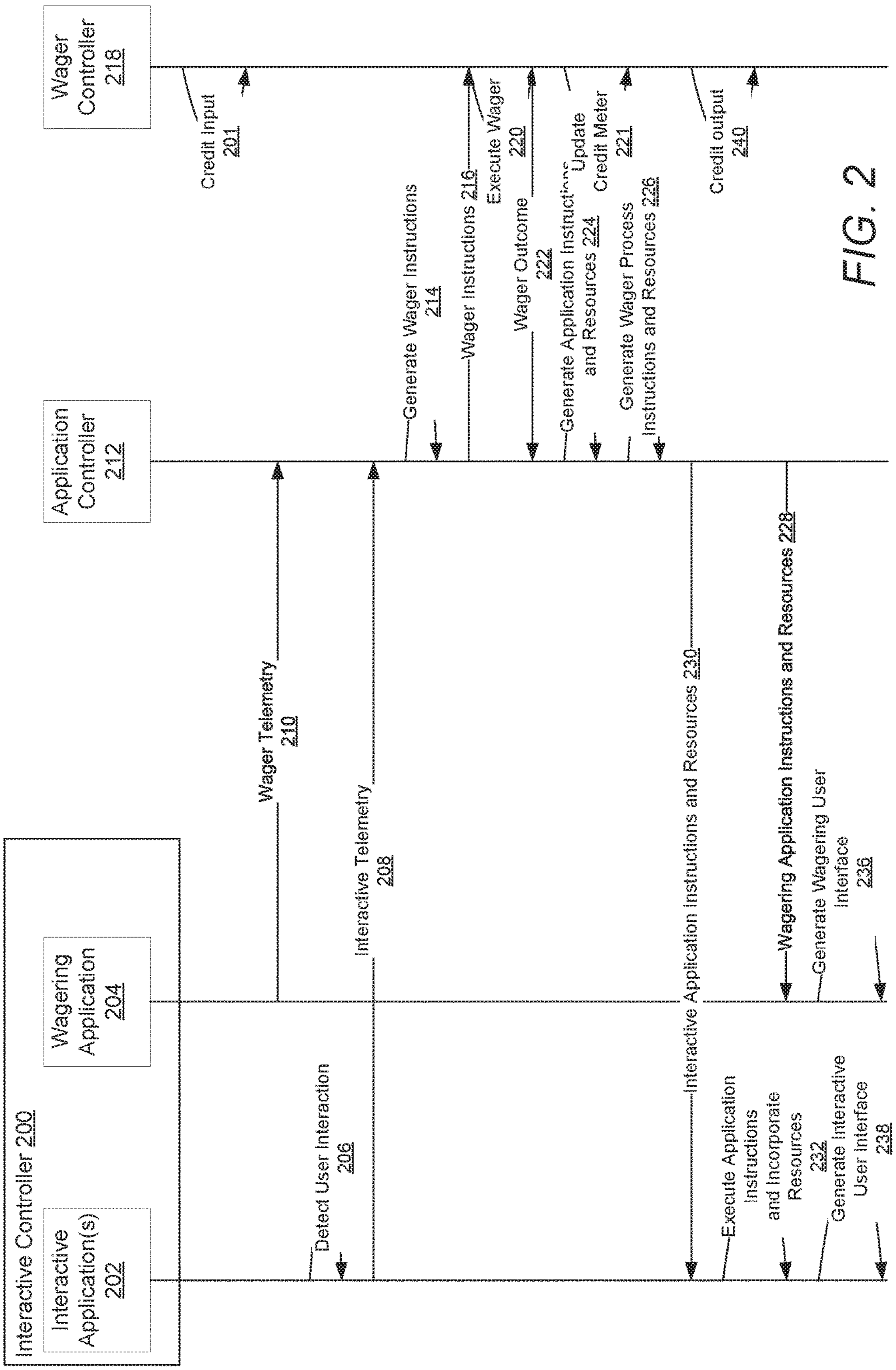
FIG. 2 is a sequence diagram of a wagering protocol of a modular interactive application interleaved wagering system in accordance with various embodiments of the invention.

FIG. 2 is a sequence diagram of a wagering protocol of a modular interactive application interleaved wagering system in accordance with various embodiments of the invention. The wager controller receives (201) a credit input from a user and transfers credits to a credit meter associated with the user as described herein. An interactive controller 200 provides an execution environment for an interactive application 202 and a wagering application 204. The wagering application 204 determines wager configuration data based on inputs from a user. The wager configuration data is communicated by the wagering application 204 to an application controller 212 as wager telemetry data 210. The interactive application 202 detects (206) a user's interaction with elements of the interactive application 202. The interactive application 202 communicates interactive application telemetry data 210 including the user's interactions to the application controller 212. The application controller 212 receives the interactive application telemetry data 210 and uses interactive application telemetry data 210 to generate (214) wager instruction data 216. The application controller 212 communicates the wager instruction data 216 to the wager controller 218. The wager controller 218 receives the wager instruction data 216 and uses the wager instruction data 216 to execute (220) a wager and generate wager outcome data 222. The wager controller 218 communicates the wager outcome data 222 to the application controller 212 and updates (221) the user's credit meter based on the wager outcome. The application controller 212 receives the wager outcome data 222 and uses the wager outcome data 222 to generate (224) interactive application and wagering application resource and instruction data 230. The application controller 212 also uses wager outcome data 222 to generate (226) wagering process instruction and resource data 228. The application controller 212 communicates the interactive application and wagering application resource and instruction data 230 to the interactive application 202 of interactive controller 200. The interactive application 202 receives the interactive application instruction and resource data 230 and executes (232) instructions included in the interactive application instruction and resource data 230 and incorporates into the interactive application 202 interactive application resources included in the interactive application instruction and resource data 230. The wagering application 204 receives the wagering application user interface data and wagering process data included in wagering application instruction and resource data 228 to generate (236) a wagering user interface. The interactive application 202 generates (238) an interactive user interface using interactive application instruction and resource data included in application instruction and resource data 230. At the end of a wagering session, the wager controller 218 transfers credit off of the user's credit meter and generates (240) a credit output as described herein based on the credits stored in the user's credit meter.

In some embodiments, the credits used for wagering are credits in a real or virtual currency (Cr) or application credits (AC) as described herein.

Figure 3:
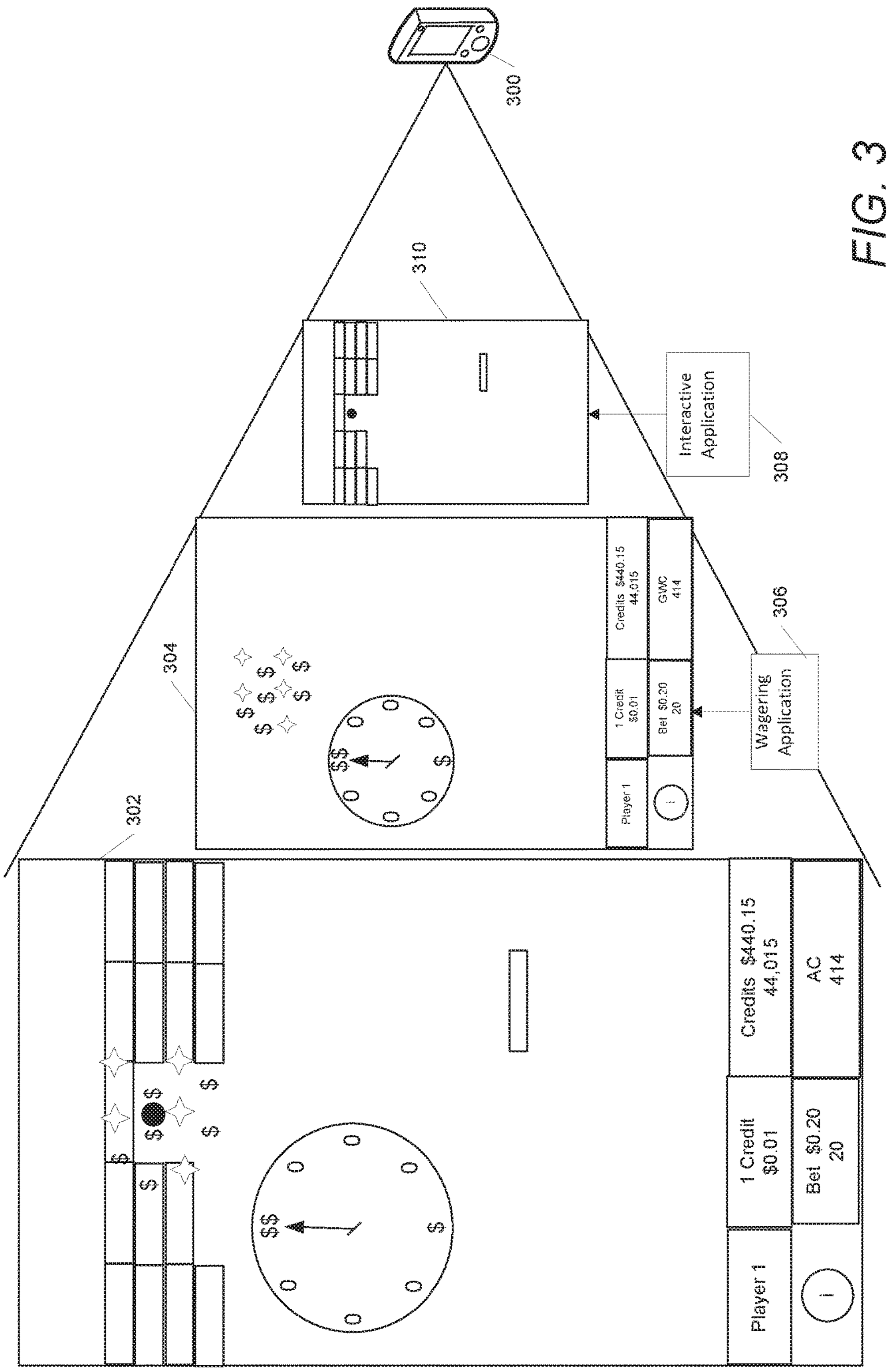
FIG. 3 is a diagram of a user interface display overlay in accordance with various embodiments of the invention.

FIG. 3 is a diagram of a user interface display overlay in accordance with various embodiments of the invention. A wagering application 306 and one or more interactive application(s) executing on an interactive controller 300 cooperate to generate a combined display 302 for presentation to a user. The combined display 302 includes display components that are used by the wagering application and the interactive application(s) 308 to display information to a user. The combined display 302 includes wagering information collected in an organized display region 304 supplied by the wagering application 306. The wagering information includes, but is not limited to, indication of a user or player, indication of an amount of Cr to be wagered, an indication of a total amount of Cr that the user has available, a selectable icon for information about the wagering process, indication of a denomination of a single Cr, and an amount of AC earned by the user, indication of a wagering process indicating a type of a wagering mechanic, and indication of a wagering outcome. The combined display 302 also includes components 310 generated by the interactive application 308, including but not limited to, elements that are utilized by the user that when utilized, trigger a wager as described herein. In the illustration, the interactive application is a game of skill similar to Breakout-style game having a ball that is reflected from a user controlled paddle at a wall composed of individual bricks. When the ball strikes a brick, the brick is destroyed. In such a skill-based game, a user's attention is focused on the ball, the paddle, or both.

In operation, the interactive application generates an interactive application user interface including the components 310 generated by the interactive application 308 and the wagering application generates a wagering user interface including the organized display region 304 supplied by the wagering application 306. The interactive application user interface and the wagering user interface are combined to create the combined display 302 that is then displayed to the user.

Figure 4A:
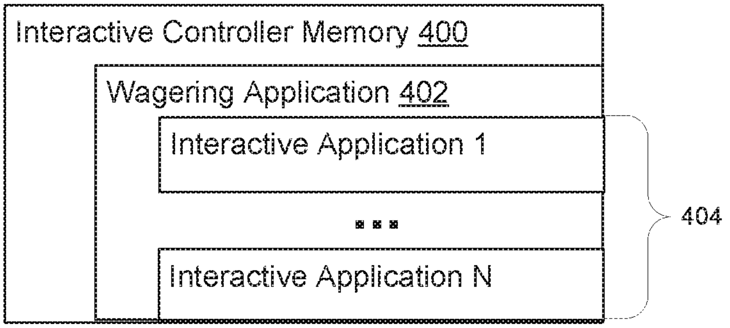
FIGS. 4A and 4B are memory allocation diagrams for a modular interactive application interleaved wagering system in accordance with various embodiments of the invention.

FIG. 4A is a memory allocation diagrams for a modular interactive application interleaved wagering system in accordance with various embodiments of the invention. As seen in FIG. 4A, a memory store 400 of an interactive controller includes a wagering application 402. The wagering application includes one or more interactive applications 404. In operation, the wagering application is executed by the interactive controller. The wagering application receives from the user a selection of a selected one of the one or more interactive applications for execution simultaneously with the wagering application 402. The wagering application generates a wagering user interface as described herein and the selected interactive application generates an interactive user interface as described herein. The wagering user interface and the interactive user interface are combined to create a combined user interface as described herein.

Figure 4B:
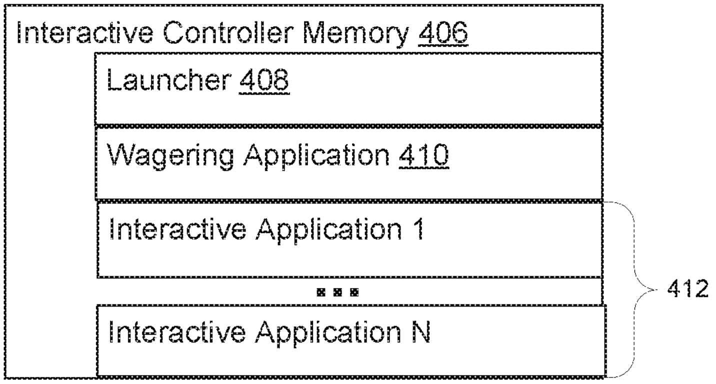

FIG. 4B is a memory allocation diagrams for another modular interactive application interleaved wagering system in accordance with various embodiments of the invention. As seen in FIG. 4B, a memory store 406 of an interactive controller includes a launcher 408, a wagering application 410 and one or more interactive applications 412. In operation, the launcher 408 is executed by the interactive controller. The launcher 408 receives from the user a selection of a selected one of the one or more interactive applications 412 for execution simultaneously with the wagering application 410. The launcher 408 initiates execution by the interactive controller of the wagering application and the selected interactive application. The wagering application generates a wagering user interface as described herein and the selected interactive application generates an interactive user interface as described herein. The wagering user interface and the interactive user interface are combined to create a combined user interface as described herein.

Figure 5:
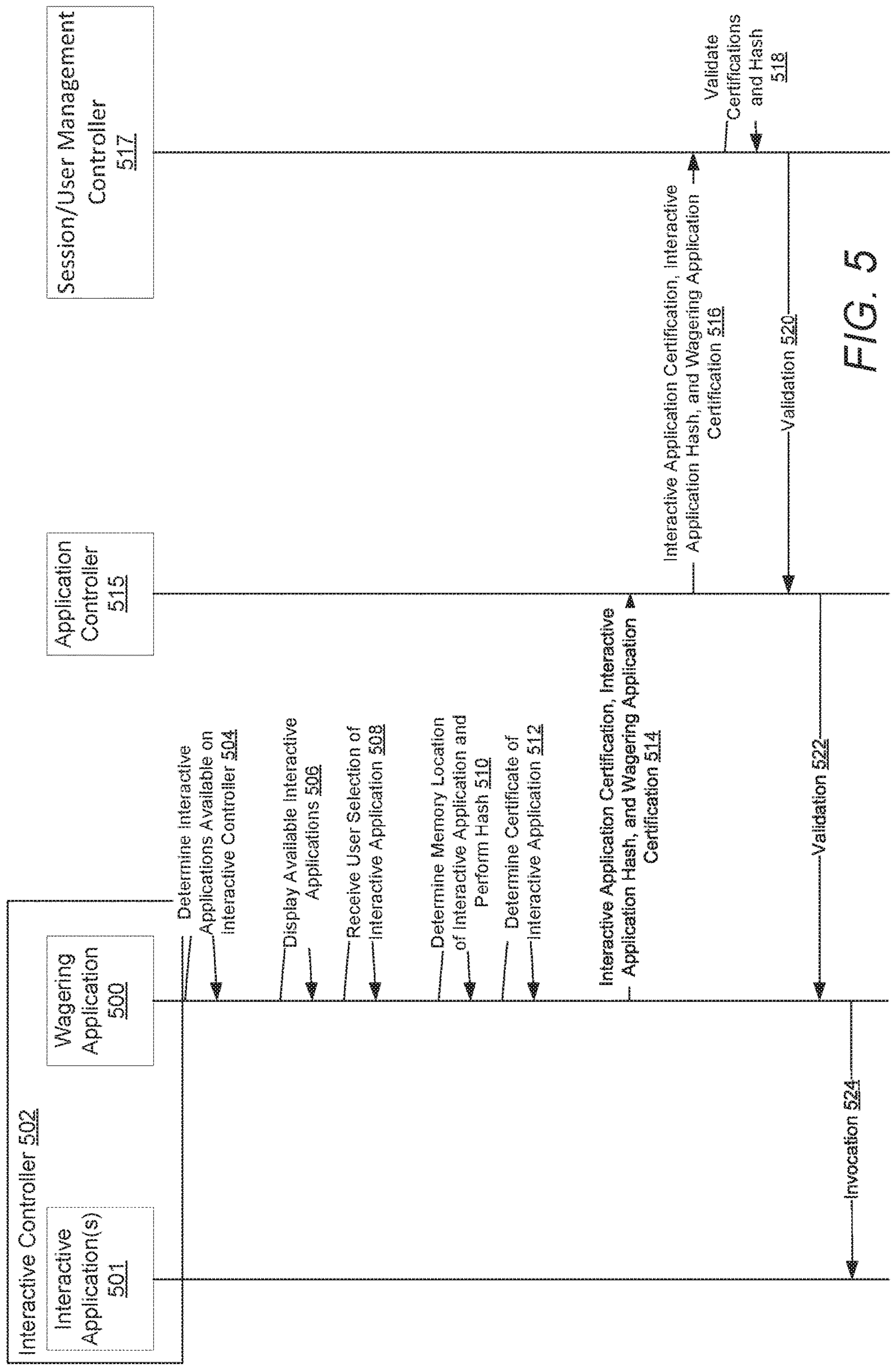
FIG. 5 is a sequence diagram of an initialization protocol for a modular interactive application interleaved wagering system in accordance with various embodiments of the invention.

FIG. 5 is a sequence diagram of an initialization protocol for a modular interactive application interleaved wagering system in accordance with various embodiments of the invention. During an initialization process, a wagering application 500 of an interactive controller 502 determines 504 if there are one or more interactive applications 501 available for a user on the interactive controller. If so, the wagering application generates a list of available interactive applications and displays 506 the list to the user. The user selects one of the available interactive applications from the list and the wagering application receives 508 the user selection of the selected interactive application. The wagering application determines 510 a memory location of the instructions and configuration data of the selected interactive application, reads the instructions and configuration data of the interactive application into memory, and performs a hash 510 of the instructions and data of the interactive application. The wagering application also determines 512 a certificate of the interactive application stored with the interactive application. The wagering application communicates 514 the certificate of the interactive application, the hash of the interactive application, and the wagering application's own certificate to an application controller 515. The application controller forwards 516 the certificate of the interactive application, the hash of the interactive application, and the wagering application's own certificate to a session/user management controller 517 for validation. The session/user management controller receives the interactive application, the hash of the interactive application, and the wagering application's own certificate and validates 518 the interactive application for use with the certified wagering application by comparing the interactive application's validation data with interactive application data previously stored by the session/user management controller. The session/user management controller 517 communicates data of the validation 520 to the application controller 515. The application controller forwards 522 the data of the validation to the wagering application 500 of the interactive controller 502. Responsive to receiving the data of the validation, the wagering application invokes 524 the selected interactive application of the one or more interactive applications 501.

Figure 6:
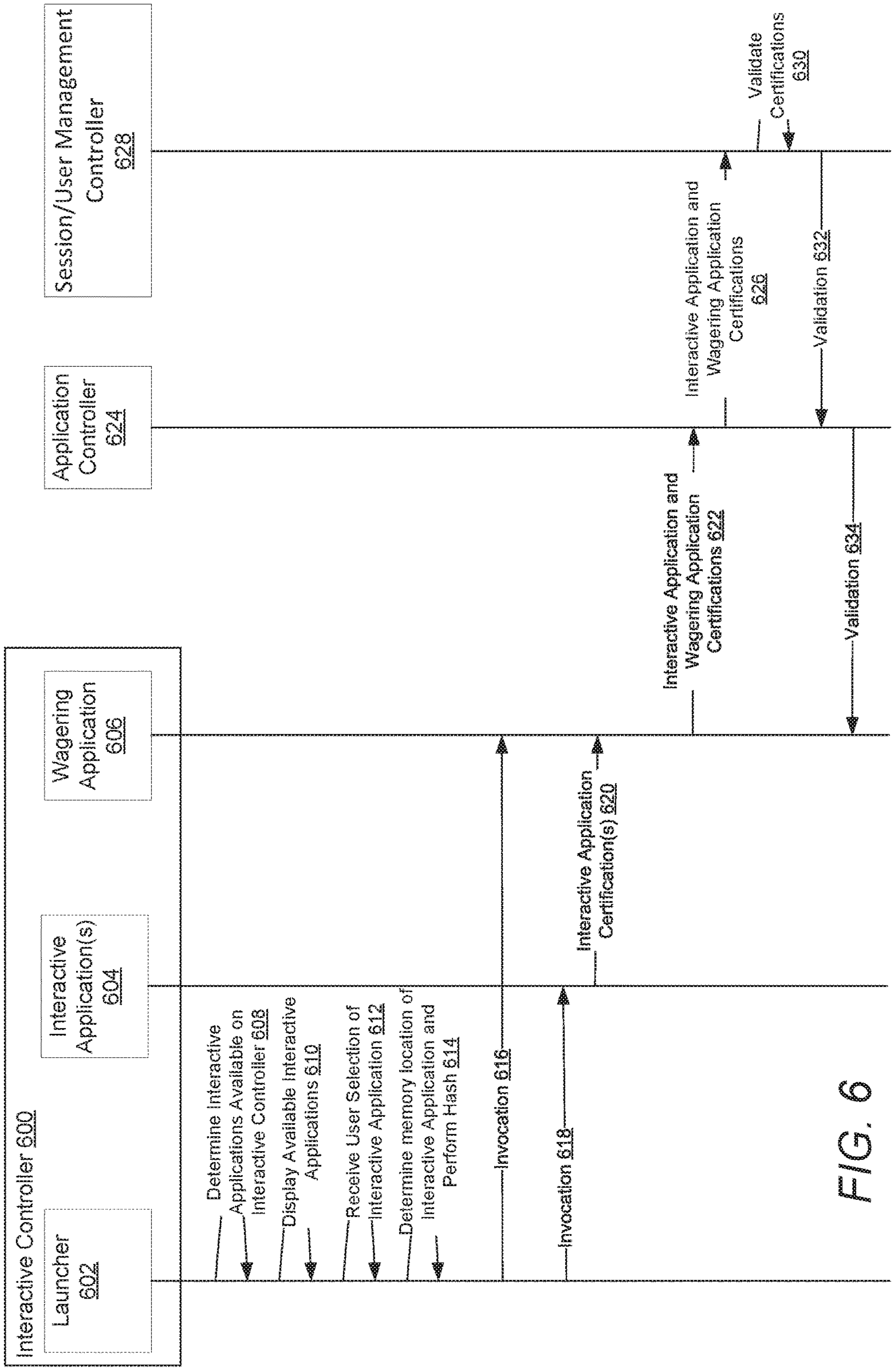
FIG. 6 is another sequence diagram of an initialization protocol for a modular interactive application interleaved wagering system in accordance with various embodiments of the invention.

FIG. 6 is another sequence diagram of an initialization protocol for a modular interactive application interleaved wagering system in accordance with various embodiments of the invention. During an initialization process, a launcher 602 of an interactive controller 600 determines 608 if there are one or more interactive applications 604 available for a user on the interactive controller. If so, the launcher generates a list of available interactive applications and displays 610 the list to the user. The user selects one of the available interactive applications from the list and the launcher receives 612 the user selection of the selected interactive application. The launcher determines a memory location of the instructions and configuration data of the selected interactive application, reads the instructions and configuration data of the interactive application into memory, and performs a hash 614 of the instructions and data of the interactive application. The launcher invokes 616 a wagering application for execution by the interactive controller 600 and communicates the hash of the selected interactive application to the wagering application. The launcher also invokes the selected interactive application of the one or more interactive applications 604 for execution by the interactive controller 600. The wagering application receives 620 a certificate of the interactive application stored with the interactive application from the interactive application. The wagering application communicates 622 the certificate of the interactive application, the hash of the interactive application, and the wagering application's own certificate to an application controller 624. The application controller forwards 624 the certificate of the interactive application, the hash of the interactive application, and the wagering application's own certificate to a session/user management controller 628 for validation. The session/user management controller receives the interactive application, the hash of the interactive application, and the wagering application's own certificate and validates 630 the interactive application for use with the certified wagering application by comparing the interactive application's validation data with interactive application data previously stored by the session/user management controller. The session/user management controller communicates data of the validation 632 to the application controller 624. The application controller forwards 634 the data of the validation to the wagering application 606 of the interactive controller 600. Responsive to receiving the data of the validation, the wagering application permits the continued execution of the selected interactive application of the one or more interactive applications 604.

Figure 7:
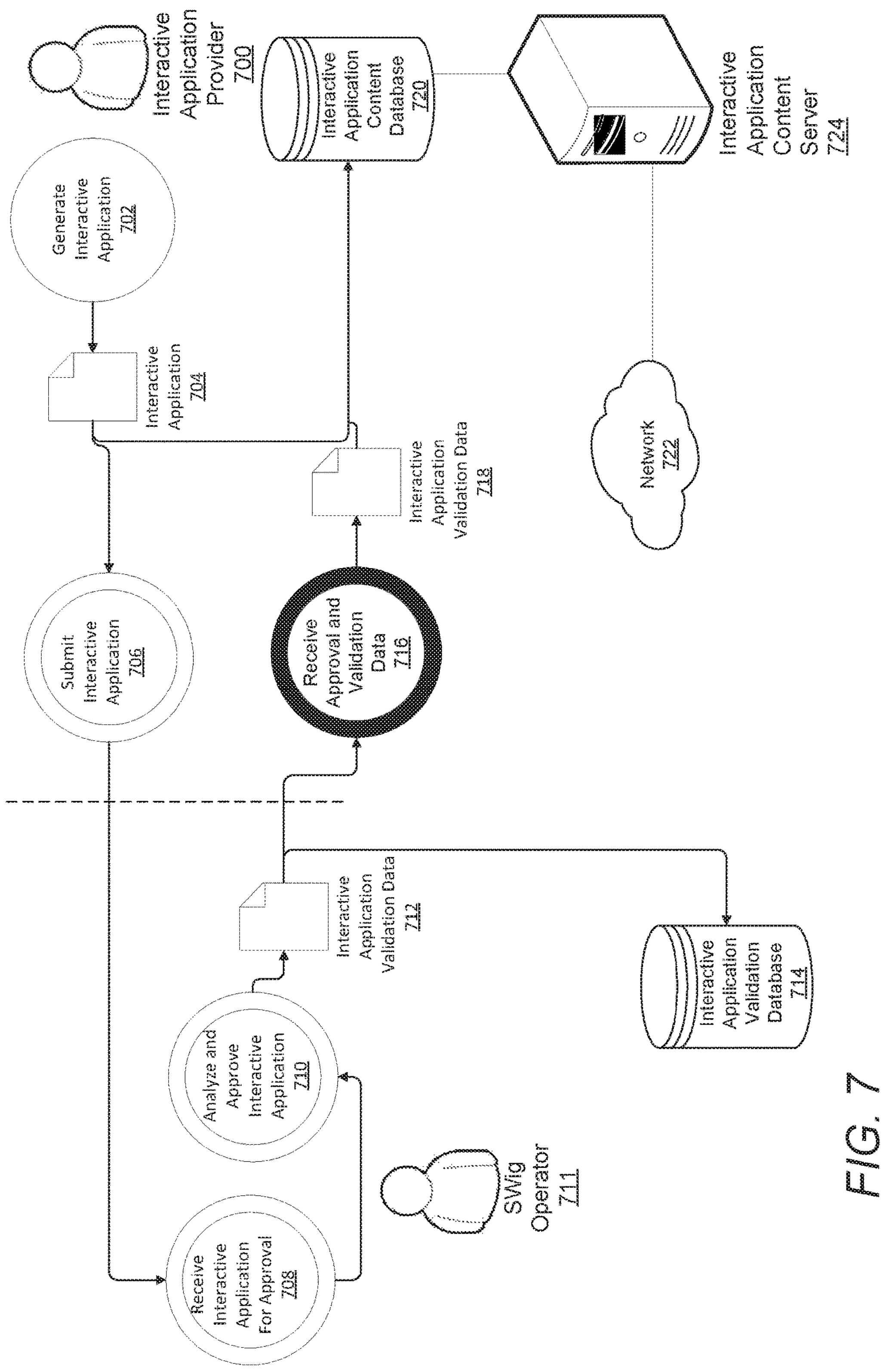
FIG. 7 is a workflow diagram for a process of approving and deploying an interactive application in accordance with various embodiments of the invention.

FIG. 7 is a workflow diagram for a process of approving and deploying an interactive application in accordance with various embodiments of the invention. An interactive application provider 700 generates 702 an interactive application 704 and submits 706 the interactive application to a session/user management controller (not shown) under the control of a skill wagering interleaved gaming operator 711. The session/user management controller analyzes 710 the interactive application 704 and determines interactive application validation data 712 that is stored in an interactive application validation database 714 of the session/user management controller. The session/user management controller communicates 716 the interactive application validation data 712 along with an approval of the interactive application 704 to the interactive application provider 700. The session/user management controller also communicates 716 the interactive application validation data 712 along with an approval of the interactive application 704 to an interactive application content server 724 and the interactive content server 724 stores the interactive application validation data 712 along with an approval of the interactive application 704 along with the interactive application 704 in an interactive application content database 720.

During operation the interactive application content server 724 and the session/user management controller (not shown) are operatively connected to one or more application controllers (not shown) by a network 722. The one or more application controllers access the interactive application content server 724 and the session/user management controller to load and validate the interactive application 704 at runtime.

Figure 8:
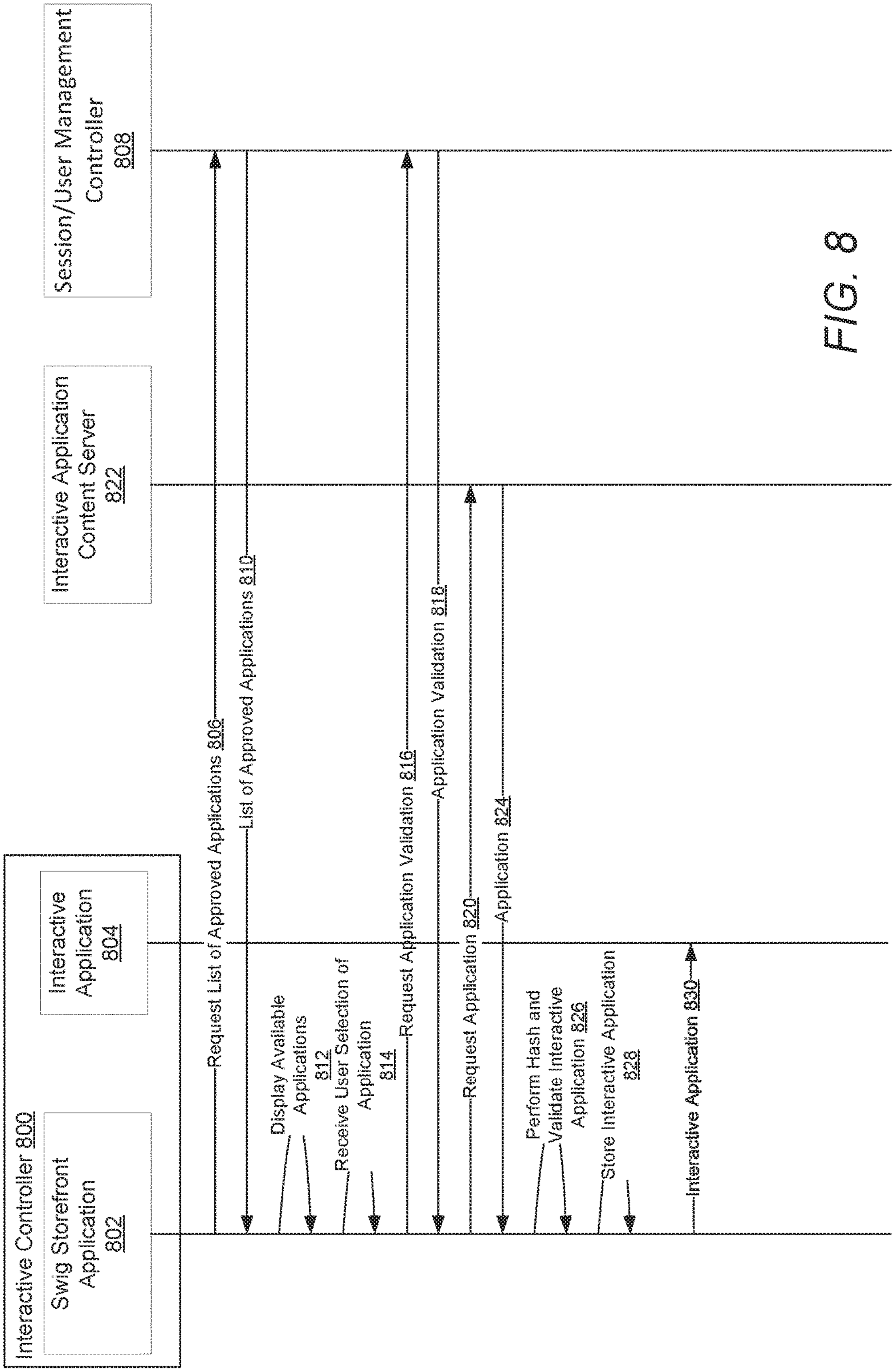
FIG. 8 is a sequence diagram of an installation protocol for an interactive application in accordance with various embodiments of the invention.

FIG. 8 is a sequence diagram of an installation protocol for an interactive application in accordance with various embodiments of the invention. SWig storefront application 802 executing on an interactive controller communicates 806 a request for a list of approved interactive applications to a session/user management controller 808. The session/user management controller 808 communicates 810 a list of approved interactive applications to the SWig storefront application. The SWig storefront application displays 812 the list of available and approved interactive applications to a user. The SWig storefront application receives 814 a user selection of a selected interactive application from the list of approved interactive applications. The SWig storefront application communicates 816 data of a request for validation of the selected interactive application to the session/user management controller 808. The session/user management controller receives the request for validation of the selected interactive application and validates the selected interactive application using previously stored interactive validation data as described herein. The session/user management controller communicates validation data 818 of the selected interactive application to the SWig storefront application 802. Responsive to receiving the selected interactive application validation data, the SWig storefront application communicates 820 interactive application request data to an interactive application content server 822 storing the selected interactive application. The interactive application content server receives the selected interactive application request data and, responsive to the selected interactive application request data, communicates the selected interactive application 824 to the SWig storefront application. The SWig storefront application performs 826 a hash on the received selected interactive application to validate the received selected interactive application using the selected application validation data 818 received from the session/management controller 808. If validated, the selected interactive application is stored 828 in a memory of the interactive controller 800 and the SWig storefront application invokes 830 the selected interactive application 804 for execution on the interactive controller 800.

Figure 9A:
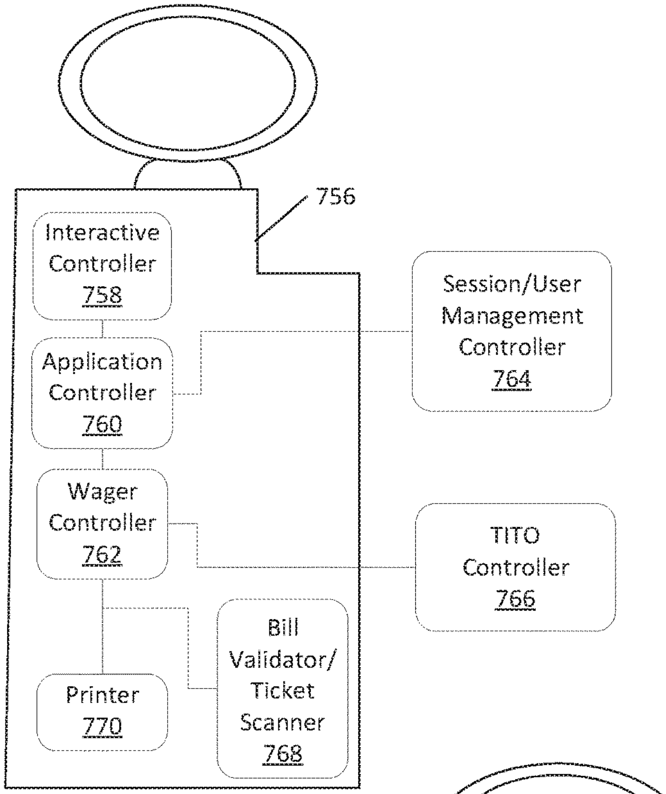
FIG. 9A is a diagram of a land-based configuration of a modular interactive application interleaved wagering system in accordance with various embodiments of the invention.

FIG. 9A is a diagram of a land-based configuration of a modular interactive application interleaved wagering system in accordance with various embodiments of the invention. Land-based configurations are suitable for deployment in a gaming establishment as an electronic gaming machine similar to a slot machine or the like. A land-based configuration includes an enclosure constructed to mount one or more user input devices operatively connected to and interactive controller, one or more user output devices operatively connected to the interactive controller, one or more credit input devices operatively connected to a wager controller, and one or more credit output devices operatively connected to the wager controller.

A land-based configuration of a modular interactive application interleaved wagering system 756 includes an interactive controller 758, an application controller 760 and a wager controller 762 housed in a common enclosure. Application controller 760 is operatively connected to an external session/user management controller 764. The wager controller 762 is operatively connected to a ticket-in-ticket-out (TITO) controller 766 or other type of credit controller. The wager controller 762 communicates with the TITO controller 766 to obtain amounts of credits used for wagering. In operation, the wager controller 762 uses a bill validator/ticket scanner 768 to scan a TITO ticket having indicia of credit account data of a credit account of the TITO controller 766. The wager controller 762 communicates the credit account data to the TITO controller 766. The TITO controller 766 uses the credit account data to determine an amount of credits to transfer to the wager controller 762. The TITO controller 766 communicates the amount of credits to the wager controller 762. The wager controller 762 credits the one or more credit meters with the amount of credits so that the credits can be used when a user makes wagers using the modular interactive application interleaved wagering system 756. In addition, the wager controller 762 can use the TITO controller 766 along with a ticket printer 770 to generate a TITO ticket for a user. In operation, the wager controller 762 communicates an amount of credits for a credit account on the TITO controller 766. The TITO controller 766 receives the amount of credits and creates the credit account and credits the credit account with the amount of credits. The TITO controller 766 generates credit account data for the credit account and communicates the credit account data to the wager controller 762. The wager controller 762 uses the ticket printer 770 to print indicia of the credit account data onto a TITO ticket.

In many embodiments, a credit processing subcontroller of the wager controller 762 operatively connects to one or more credit input devices for generating incoming credit data from a credit input. Credit inputs can include, but are not limited to, credit items used to transfer credits. The incoming credit data are communicated by the credit processing subcontroller to the wager controller 762. In various embodiments, the one or more credit input devices and their corresponding credit items include, but are not limited to: card readers for reading cards having magnetic stripes, RFID chips, smart chips, and the like; scanners, such as bill validator/ticket scanner 768, for reading various types of printed indicia printed on to various types of media such as vouchers, coupons, TITO tickets, rewritable cards, or the like; and bill validator and/or coin validators that receive and validate paper and/or coin currency or tokens, such as bill validator/ticket scanner 768.

In various embodiments, the credit processing subcontroller is operatively connected to one or more credit output devices, such as printer, for generating a credit output based on outgoing credit data communicated from the wager controller. Credit outputs can include, but are not limited to, credit items used to transfer credits. Types of credit output devices and their corresponding credit items may include, but are not limited to: writing devices that are used to write to cards having magnetic stripes, smart chips or the like; printers, such as printer 770, for printing various types of printed indicia onto vouchers, coupons, TITO tickets, vouchers, rewritable cards or the like; and bill and/or coin dispensers that output paper and/or coin currency or tokens.

In some embodiments, the credit processing subcontroller is operatively connected to, and communicates with, a TITO controller 766 or the like to determine incoming credit data representing amounts of credits to be transferred into the modular interactive application interleaved wagering system and to determine outgoing credit data representing amounts of credits to be transferred out of the modular interactive application interleaved wagering system. In operation, the credit processing subcontroller communicates with a connected credit input device, such as a bill validator/ticket scanner 768, used to scan a credit input in the form of a TITO ticket having indicia of credit account data of a credit account of the TITO controller. The credit processing subcontroller communicates the credit account data to the TITO controller. The TITO controller uses the credit account data to determine an amount of credits to transfer to the credit processing subcontroller, and thus to the wager controller 762. The TITO controller communicates the amount of credits to the credit processing subcontroller. The credit processing subcontroller communicates the amount of credits as incoming credit data to the wager controller 762 and the wager controller credits one or more credit meters with the amount of credits so that the credits can be used when a user makes wagers using the modular interactive application interleaved wagering system.

In many embodiments, the credit processing subcontroller is operatively connected to a bill validator/ticket scanner 768 as one of the one or more credit input devices. The credit processing subcontroller communicates with the bill validator/ticket scanner to scan currency used as a credit input to determine an amount of credits as incoming credit data to transfer credit to one or more credit meters associated with one or more users. The wager controller 762 credits the one or more credit meters with the amount of credits so that the credits can be used when a user makes wagers using the modular interactive application interleaved wagering system.

In some embodiments, the credit processing subcontroller can use a TITO controller along with a ticket or voucher printer 770 as one of the one or more credit output devices to generate a TITO ticket as a credit output for a user. In operation, the credit processing subcontroller communicates, as outgoing credit data, data of an amount of credits to be credited to a credit account on the TITO controller. The TITO controller receives the amount of credits and creates the credit account and credits the credit account with the amount of credits. The TITO controller generates credit account data for the credit account and communicates the credit account data to the credit processing subcontroller. The credit processing subcontroller uses the ticket or voucher printer 770 to print indicia of the credit account data onto a TITO ticket or voucher as a credit output.

In various embodiments, the credit processing subcontroller provides an interface to an electronic payment management system (not shown) such as an electronic wallet or the like. The electronic payment system provides credit account data that is used for generating incoming credit data as a credit input and outgoing credit data as a credit output.

Figure 9B:
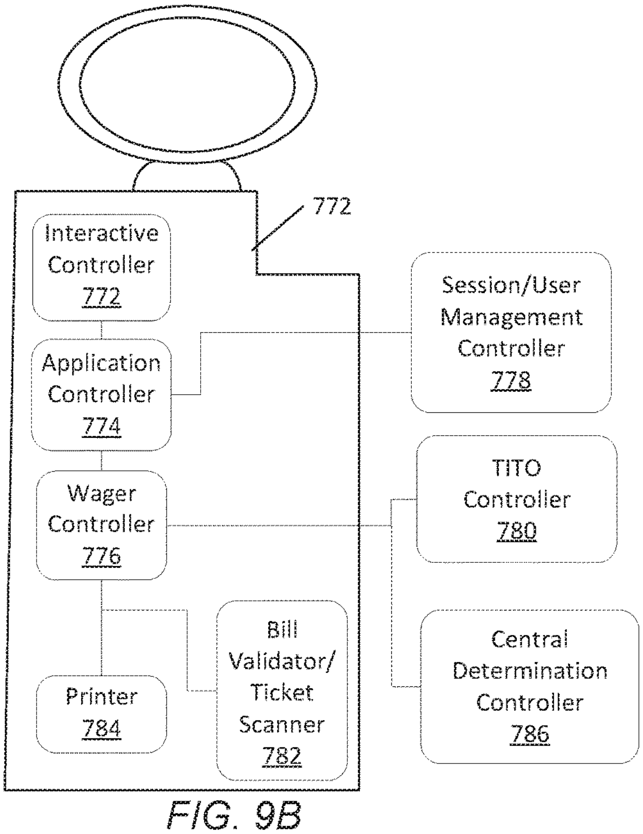
FIG. 9B is another diagram of a land-based configuration of a modular interactive application interleaved wagering system in accordance with various embodiments of the invention.

FIG. 9B is a diagram of another land-based configuration of a modular interactive application interleaved wagering system in accordance with various embodiments of the invention. Land-based configurations are suitable for deployment in a gaming establishment as an electronic gaming machine similar to a slot machine or the like. A land-based configuration includes an enclosure constructed to mount one or more user input devices operatively connected to and interactive controller, one or more user output devices operatively connected to the interactive controller, one or more credit input devices operatively connected to a wager controller, and one or more credit output devices operatively connected to the wager controller. A land-based configuration of a modular interactive application interleaved wagering system 772 includes an interactive controller 772, an application controller 774 and a wager controller 776 housed in a common enclosure. Application controller 774 is operatively connected to an external session/user management controller 778. The wager controller 776 is operatively connected to a ticket-in-ticket-out (TITO) controller 780 or other type of credit controller. The wager controller 776 communicates with the TITO controller 780 to obtain amounts of credits used for wagering. In operation, the wager controller 776 uses a bill validator/ticket scanner 782 to scan a TITO ticket having indicia of credit account data of a credit account of the TITO controller 780. The wager controller 776 communicates the credit account data to the TITO controller 780. The TITO controller 780 uses the credit account data to determine an amount of credits to transfer to the wager controller 776. The TITO controller 780 communicates the amount of credits to the wager controller 776. The wager controller 776 receives the amount of credits and credits the one or more credit meters with the amount of credits so that the credits can be used when a user makes wagers using the modular interactive application interleaved wagering system 772. In addition, the wager controller 776 can use the TITO controller 780 along with a ticket printer 784 to generate a TITO ticket for a user. In operation, the wager controller 776 communicates an amount of credits for a credit account on the TITO controller 780. The TITO controller 780 receives the amount of credits and creates the credit account and credits the credit account with the amount of credits. The TITO controller 780 generates credit account data for the credit account and communicates the credit account data to the wager controller 776. The wager controller 776 uses the ticket printer 784 to print indicia of the credit account data onto a TITO ticket.

The wager controller 776 is operatively connected to a central determination controller 786. In operation, when the wager controller 776 needs to determine a wager outcome, the wager controller communicates a request to the central determination controller 786 for the wager outcome. The central determination controller 786 receives the wager outcome request and generates a wager outcome in response to the wager request. The central determination controller 786 communicates the wager outcome to the wager controller 776. The wager controller 776 receives the wager outcome and utilizes the wager outcome as described herein. In some embodiments, the wager outcome is drawn from a pool of pre-determined wager outcomes. In some embodiments, the wager outcome is a pseudo random result or random result that is utilized by the wager controller along with paytables to determine a wager outcome as described herein.

In many embodiments, a credit processing subcontroller of the wager controller 776 operatively connects to one or more credit input devices for generating incoming credit data from a credit input. Credit inputs can include, but are not limited to, credit items used to transfer credits. The incoming credit data are communicated by the credit processing subcontroller to the wager controller 776. In various embodiments, the one or more credit input devices and their corresponding credit items include, but are not limited to: card readers for reading cards having magnetic stripes, RFID chips, smart chips, and the like; scanners, such as bill validator/ticket scanner 782, for reading various types of printed indicia printed on to various types of media such as vouchers, coupons, TITO tickets, rewritable cards, or the like; and bill validator and/or coin validators that receive and validate paper and/or coin currency or tokens, such as bill validator/ticket scanner 782.

In various embodiments, the credit processing subcontroller is operatively connected to one or more credit output devices, such as printer, for generating a credit output based on outgoing credit data communicated from the wager controller. Credit outputs can include, but are not limited to, credit items used to transfer credits. Types of credit output devices and their corresponding credit items may include, but are not limited to: writing devices that are used to write to cards having magnetic stripes, smart chips or the like; printers, such as printer 784, for printing various types of printed indicia onto vouchers, coupons, TITO tickets, vouchers, rewritable cards or the like; and bill and/or coin dispensers that output paper and/or coin currency or tokens.

In some embodiments, the credit processing subcontroller is operatively connected to, and communicates with, a TITO controller 776 or the like to determine incoming credit data representing amounts of credits to be transferred into the modular interactive application interleaved wagering system and to determine outgoing credit data representing amounts of credits to be transferred out of the modular interactive application interleaved wagering system. In operation, the credit processing subcontroller communicates with a connected credit input device, such as a bill validator/ticket scanner 782, used to scan a credit input in the form of a TITO ticket having indicia of credit account data of a credit account of the TITO controller. The credit processing subcontroller communicates the credit account data to the TITO controller. The TITO controller uses the credit account data to determine an amount of credits to transfer to the credit processing subcontroller, and thus to the wager controller 776. The TITO controller communicates the amount of credits to the credit processing subcontroller. The credit processing subcontroller communicates the amount of credits as incoming credit data to the wager controller 776 and the wager controller credits one or more credit meters with the amount of credits so that the credits can be used when a user makes wagers using the modular interactive application interleaved wagering system.

In many embodiments, the credit processing subcontroller is operatively connected to a bill validator/ticket scanner 782 as one of the one or more credit input devices. The credit processing subcontroller communicates with the bill validator/ticket scanner to scan currency used as a credit input to determine an amount of credits as incoming credit data to transfer credit to one or more credit meters associated with one or more users. The wager controller 776 credits the one or more credit meters with the amount of credits so that the credits can be used when a user makes wagers using the modular interactive application interleaved wagering system.

In some embodiments, the credit processing subcontroller can use a TITO controller 780 along with a ticket or voucher printer 784 as one of the one or more credit output devices to generate a TITO ticket as a credit output for a user. In operation, the credit processing subcontroller communicates, as outgoing credit data, data of an amount of credits to be credited to a credit account on the TITO controller 780. The TITO controller 780 receives the amount of credits and creates the credit account and credits the credit account with the amount of credits. The TITO controller 780 generates credit account data for the credit account and communicates the credit account data to the credit processing subcontroller. The credit processing subcontroller uses the ticket or voucher printer 784 to print indicia of the credit account data onto a TITO ticket or voucher as a credit output.

In various embodiments, the credit processing subcontroller provides an interface to an electronic payment management system (not shown) such as an electronic wallet or the like. The electronic payment system provides credit account data that is used for generating incoming credit data as a credit input and outgoing credit data as a credit output.

Figure 10A:
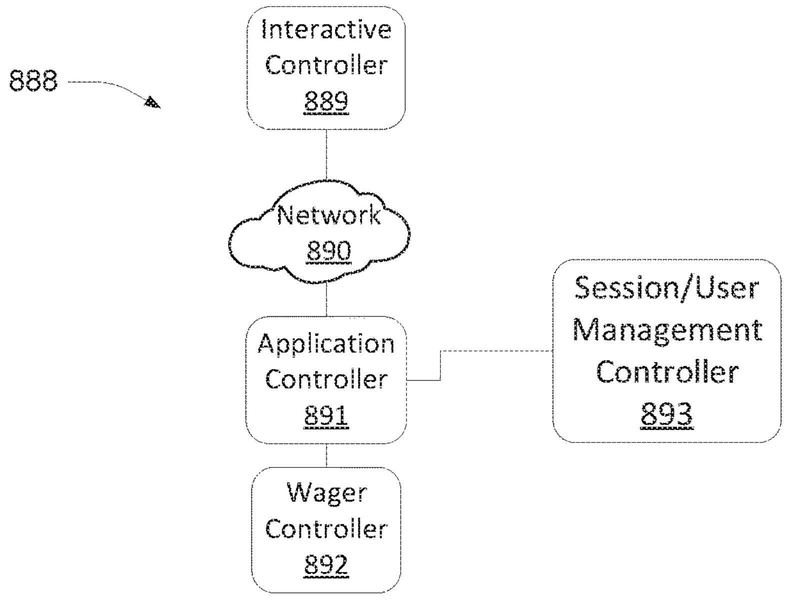
FIG. 10A is a diagram of an interactive configuration of a modular interactive application interleaved wagering system in accordance with various embodiments of the invention.

FIG. 10A is a diagram of an interactive configuration of a modular interactive application interleaved wagering system in accordance with various embodiments of the invention. An interactive configuration of a modular interactive application interleaved wagering system is useful for deployment over a wide area network such as an internet. An interactive configuration of a modular interactive application interleaved wagering system 888 includes an interactive controller 889 operatively connected by a network 890 to an application controller 891, and a wager controller 892. Application controller 891 is operatively connected to a session/user management controller 893.

Figure 10B:
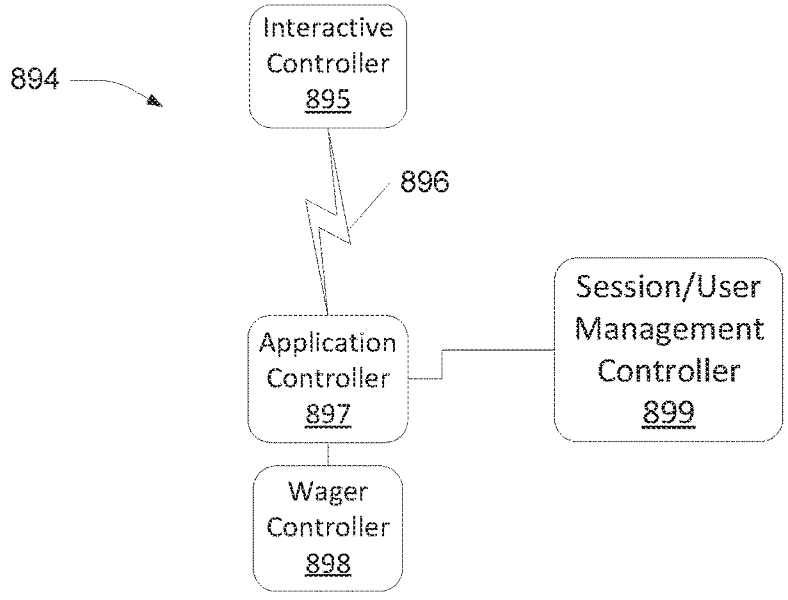
FIG. 10B is a diagram of a mobile configuration of a modular interactive application interleaved wagering system in accordance with various embodiments of the invention.

FIG. 10B is a diagram of a mobile configuration of a modular interactive application interleaved wagering system in accordance with various embodiments of the invention. A mobile configuration of a modular interactive application interleaved wagering system is useful for deployment over wireless communication network, such as a wireless local area network or a wireless telecommunications network. An interactive configuration of a modular interactive application interleaved wagering system 894 includes an interactive controller 895 operatively connected by a wireless network 896 to an application controller 897, and a wager controller 898. Application controller 897 is also operatively connected to a session/user management controller 899.

FIGS. 11A, 11B, 11C, and 11D are illustrations of interactive controllers of a modular interactive application interleaved wagering system in accordance with various embodiments of the invention. An interactive controller, such as interactive controller of FIG. 1, may be constructed from or configured using one or more processing devices configured to perform the operations of an interactive controller. An interactive controller in a modular interactive application interleaved wagering system may be constructed from or configured using any processing device having sufficient processing and communication capabilities that may be configured to perform the processes of an interactive controller in accordance with various embodiments of the invention. In some embodiments, the construction or configuration of interactive controller may be achieved through the use of a wagering application, such as a wagering application FIG. 1, and/or through the use of an interactive application, such as an interactive application of FIG. 1.

Figure 11A:
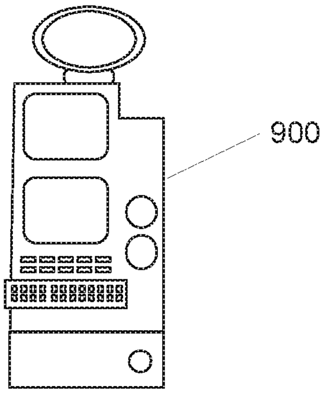
FIGS. 11A, 11B, 11C, and 11D are illustrations of interactive controllers of a modular interactive application interleaved wagering system in accordance with various embodiments of the invention.

In some embodiments, an interactive controller may be constructed from or configured using a land-based electronic gaming machine 900 as shown in FIG. 11A. The electronic gaming machine 900 may be physically located in various types of gaming establishments.

Figure 11B:
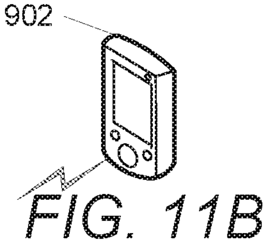

In many embodiments, an interactive controller may be constructed from or configured using a portable device 902 as shown in FIG. 11B. The portable device 902 is a device that may wirelessly connect to a network. Examples of portable devices include, but are not limited to, a tablet computer, a personal digital assistant, and a smartphone.

Figure 11C:
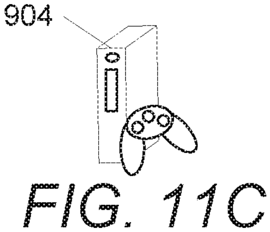

In some embodiments, an interactive controller may be constructed from or configured using a gaming console 904 as shown in FIG. 11C.

Figure 11D:
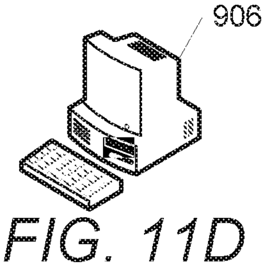

In various embodiments, an interactive controller may be constructed from or configured using a personal computer 906 as shown in FIG. 11D.

In some embodiments, a device, such as the devices of FIGS. 11A, 11B, 11C, and 1D, may be used to construct a complete modular interactive application interleaved wagering system and may be operatively connected using a communication link to a session/user management controller, such as a session/user management controller of FIG. 1.

Figure 12A:
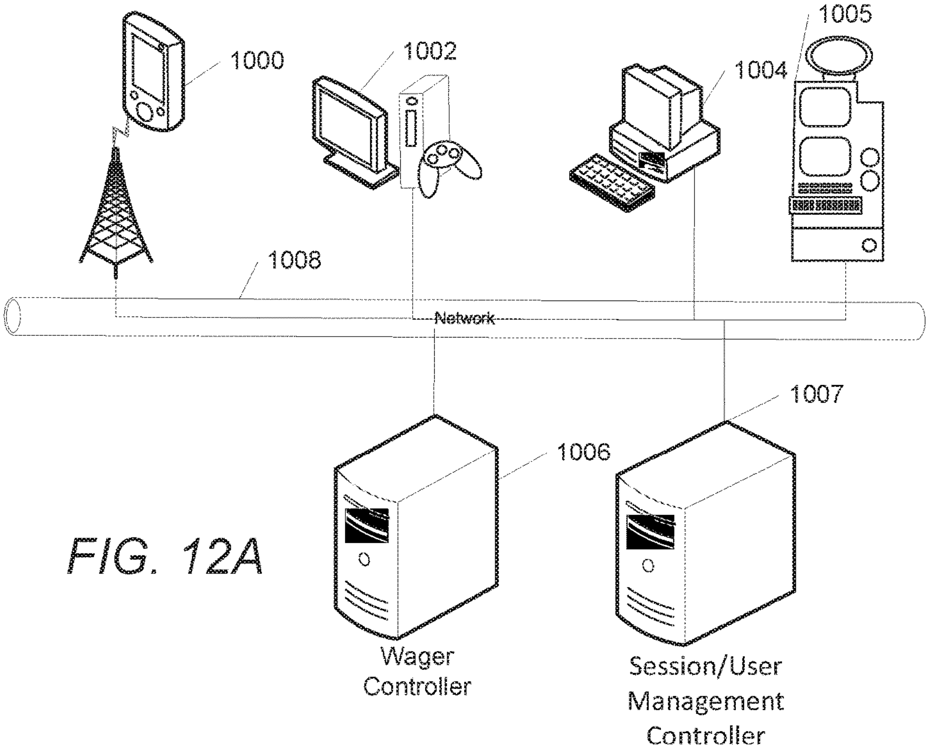
FIGS. 12A, 12B and 12C are diagrams of distributed modular interactive application interleaved wagering systems in accordance with various embodiments of the invention.
Figure 12B:
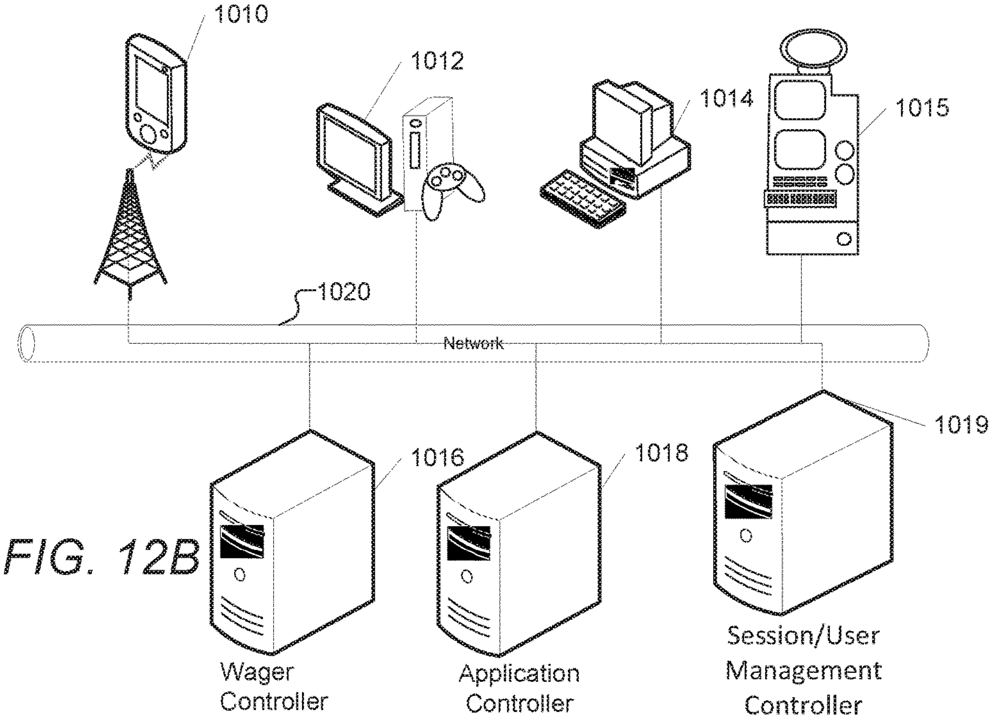
Figure 12C:
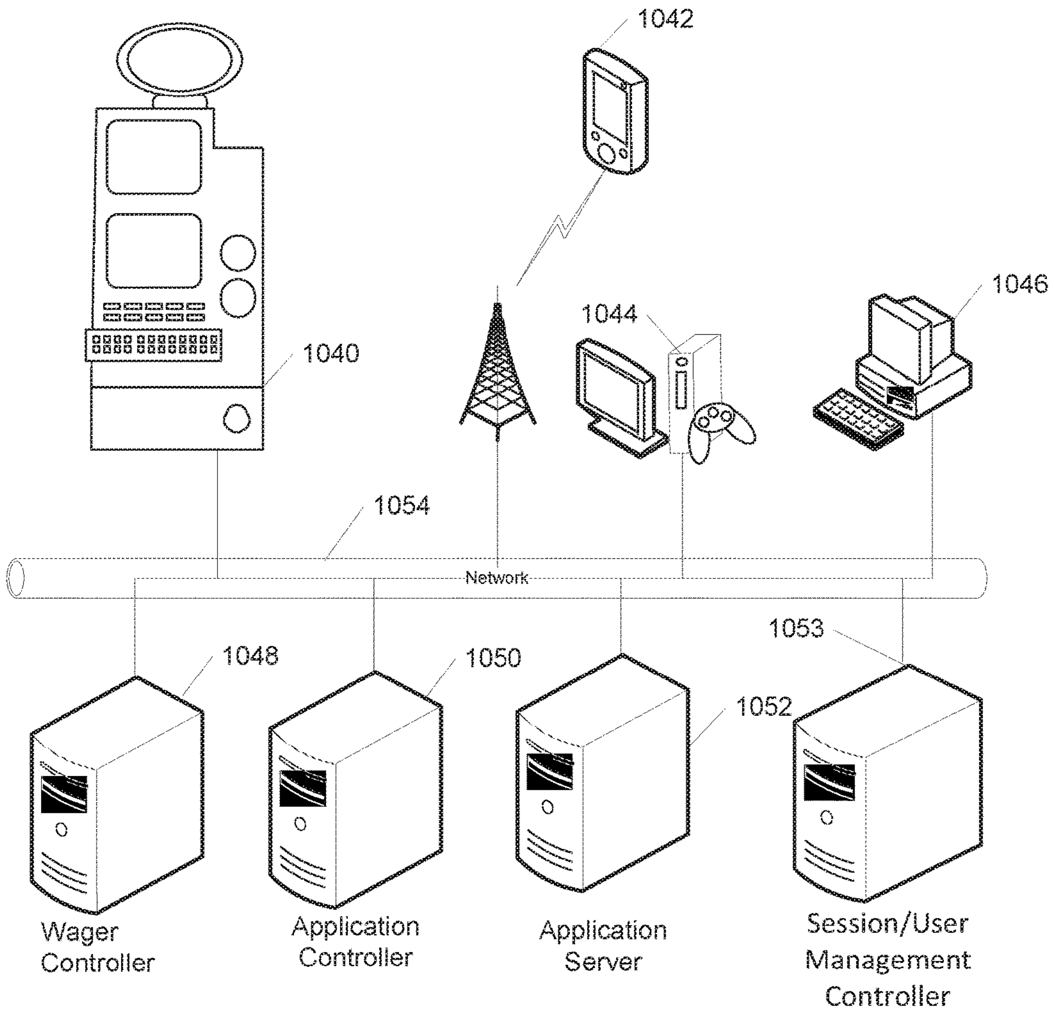

Some modular interactive application interleaved wagering systems in accordance with many embodiments of the invention can be distributed across a plurality of devices in various configurations. FIGS. 12A, 12B and 12C are diagrams of distributed modular interactive application interleaved wagering systems in accordance with various embodiments of the invention. Turning now to FIG. 12A, one or more interactive controllers of a distributed modular interactive application interleaved wagering system, such as but not limited to, a mobile or wireless device 1000, a gaming console 1002, a personal computer 1004, and an electronic gaming machine 1005, are operatively connected with a wager controller 1006 of a distributed modular interactive application interleaved wagering system using a communication link 1008. Communication link 1008 is a communications link that allows processing systems to communicate with each other and to share data. Examples of the communication link 1008 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of an interactive controller and an application controller as described herein are executed on the individual interactive controllers 1000, 1002, 1004 and 1005 while one or more processes of a wager controller as described herein can be executed by the wager controller 1006.

In many embodiments, a distributed modular interactive application interleaved wagering system and may be operatively connected using a communication link to a session/user management controller 1007, that performs the processes of a session/user management controller as described herein.

A distributed modular interactive application interleaved wagering system in accordance with another embodiment of the invention is illustrated in FIG. 12B. As illustrated, one or more interactive controllers of a distributed modular interactive application interleaved wagering system, such as but not limited to, a mobile or wireless device 1010, a gaming console 1012, a personal computer 1014, and an electronic gaming machine 1015, are operatively connected with a wager controller server 1016 and an application controller 1018 over a communication link 1020. Communication link 1020 is a communication link that allows processing systems to communicate and share data. Examples of the communication link 1020 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, the processes of an interactive controller as described herein are executed on the individual interactive controllers 1010, 1012, 1014 and 1015. One or more processes of a wager controller as described herein are executed by the wager controller 1016, and one or more processes of an application controller as described herein are executed by application controller 1018.

In many embodiments, a distributed modular interactive application interleaved wagering system and may be operatively connected using a communication link to a session/user management controller 1019, that performs the processes of a session/user management controller as described herein.

A distributed modular interactive application interleaved wagering systems in accordance with still another embodiment of the invention is illustrated in FIG. 12C. As illustrated, one or more interactive controllers of a distributed modular interactive application interleaved wagering system, such as but not limited to, a mobile device 1042, a gaming console 1044, a personal computer 1046, and an electronic gaming machine 1040 are operatively connected with a wager controller 1048 and an application controller 1050, and an interactive application server 1052 using a communication link 1054. Communication link 1054 is a communications link that allows processing systems to communicate and to share data. Examples of the communication link 1054 can include, but are not limited to: a wired or wireless interdevice communication link, a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of a display and user interface of an interactive controller as described herein are executed on the individual interactive controllers 1040, 1042, 1044 and 1046. One or more processes of a wager controller as described herein can be executed by the wager controller server 1048. One or more processes of an application controller as described herein can be executed by application controller server 1050 and one or more processes of an interactive controller excluding the display and user interfaces can be executed by interactive application server 1052.

In many embodiments, a distributed modular interactive application interleaved wagering system and may be operatively connected using a communication link to a session/user management controller 1053, that performs the processes of a session/user management controller as described herein.

In various embodiments, a session/user management controller may be operatively connected to components of a modular interactive application interleaved wagering system using a communication link. In other embodiments, a number of other peripheral systems, such as a user management system, a gaming establishment management system, a regulatory system, and/or hosting servers are also operatively connected with the modular interactive application interleaved wagering systems using a communication link. Also, other servers can reside outside the bounds of a network within a firewall of the operator to provide additional services for network connected modular interactive application interleaved wagering systems.

Although various distributed modular interactive application interleaved wagering systems are described herein, modular interactive application interleaved wagering systems can be distributed in any configuration as appropriate to the specification of a specific application in accordance with embodiments of the invention. In some embodiments, components of a distributed modular interactive application interleaved wagering system, such as an application controller, wager controller, interactive controller, or other servers that perform services for an application controller, wager controller and/or interactive controller, can be distributed in different configurations for a specific distributed modular interactive application interleaved wagering system application.

Figure 13:
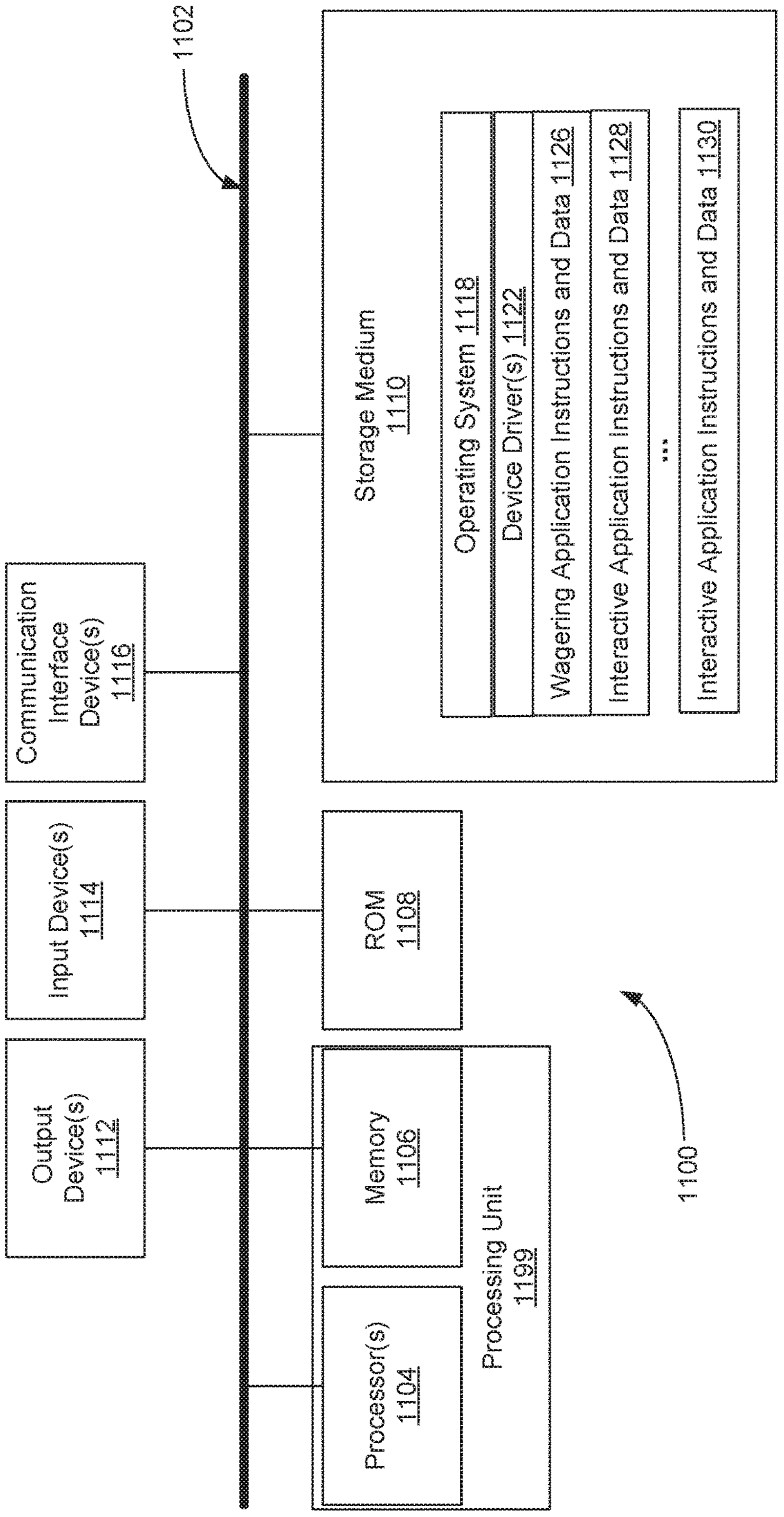
FIG. 13 is a diagram of a structure of an interactive controller of a modular interactive application interleaved wagering system in accordance with various embodiments of the invention.

FIG. 13 is a diagram of a structure of an interactive controller of a modular interactive application interleaved wagering system in accordance with various embodiments of the invention. An interactive controller may be constructed from or configured using one or more processing devices configured to perform the operations of interactive controller. In many embodiments, an interactive controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

An interactive controller 1100, suitable for use as an interactive controller of FIG. 1, provides an execution environment for an interactive application of a modular interactive application interleaved wagering system. In several embodiments, an interactive controller of a modular interactive application interleaved wagering system provides an interactive application that generates an application user interface for interaction with by a user.

In some embodiments, various components of interactive application can read data from an application state in order to provide one or more features of an interactive application. In various embodiments, components of interactive application can include, but are not limited to, a physics engine, a rules engine, and/or a graphics engine. The physics engine is used to simulate physical interactions between virtual objects in interactive application. The rules engine implements the rules of interactive application and a P/RNG that may be used for influencing or determining certain variables and/or outcomes to provide a randomizing influence on the operations of interactive application. The graphics engine is used to generate a visual representation of interactive application state to the user. Furthermore, the components may also include an audio engine to generate audio outputs for the user interface.

During operation, an interactive application reads and writes application resources stored on a data store of interactive controller 1100. The application resources may include objects having graphics and/or control logic used to provide application environment objects of interactive application. In various embodiments, the resources may also include, but are not limited to, video files that are used to generate a portion of the user presentation; audio files used to generate music, sound effects, etc. within an interactive application; configuration files used to configure the features of an interactive application; scripts or other types of control code used to provide various features of interactive application; and graphics resources such as textures, objects, etc. that are used by a graphics engine to render objects displayed in an interactive application.

In operation, components of interactive application read portions of the application state and generate the user presentation for the user that is presented to the user using the user interface. The user perceives the user presentation and provides user interactions using the HIDs. The corresponding user interactions are received as user actions or inputs by various components of interactive application 402. Interactive application translates the user actions into interactions with the virtual objects of the application environment stored in the application state. Components of an interactive application use the user interactions with the virtual objects of an interactive application and interactive application state to update the application state and update the user presentation presented to the user. The process loops continuously while the user interacts with interactive application of the modular interactive application interleaved wagering system.

Interactive controller 1100 provides one or more interfaces between interactive controller and other components of a modular interactive application interleaved wagering system, such as, but not limited to, an application controller. Interactive controller 1100 and the other modular interactive application interleaved wagering system components communicate with each other using the interfaces. The interface may be used to pass various types of data, and to communicate and receive messages, status data, commands and the like. In certain embodiments, interactive controller 1100 and an application controller communicate application instructions and environment resources and application telemetry data. In some embodiments, the communications include requests by application controller that interactive controller update the application state using data provided by application controller.

In many embodiments, a communication by an application controller includes a request that interactive controller update one or more resources using data provided by application controller. In a number of embodiments, interactive controller provides all or a portion of the application state to application controller. In some embodiments, interactive controller may also provide data about one or more of the application resources to application controller. In some embodiments, the communication includes user interactions that interactive controller communicates to application controller. The user interactions may be low level user interactions with the user interface, such as manipulation of a HID, or may be high level interactions with game objects as determined by interactive application. The user interactions may also include resultant actions such as modifications to the application state or game resources resulting from the user's interactions taken in the modular interactive application interleaved wagering system interactive application. In some embodiments, user interactions include, but are not limited to, actions taken by entities such as non-player characters (NPC) of interactive application that act on behalf of or under the control of the user.

In some embodiments, interactive controller includes a wagering user interface used to communicate modular interactive application interleaved wagering system telemetry data to and from the user. The modular interactive application interleaved wagering system telemetry data from the modular interactive application interleaved wagering system include, but are not limited to, data used by the user to configure Cr, AC and element wagers, and data about the gambling game Cr, AC and element wagers such as, but not limited to, Cr, AC and element balances and Cr, AC and element amounts wagered.

In some embodiments, interactive controller 1100 includes one or more sensors. Such sensors may include, but are not limited to, physiological sensors that monitor the physiology of the user, environmental sensors that monitor the physical environment of interactive controller, accelerometers that monitor changes in motion of interactive controller, and location sensors that monitor the location of interactive controller such as global positioning sensors (GPSs). Interactive controller 1100 communicates sensor telemetry data to one or more components of the modular interactive application interleaved wagering system.

Interactive controller 1100 includes a bus 1102 that provides an interface for one or more processors 1104, random access memory (RAM) 1106, read only memory (ROM) 1108, machine-readable storage medium 1110, one or more user output devices 1112, one or more user input devices 1114, and one or more communication interface devices 1116.

The one or more processors 1104 may take many forms, such as, but not limited to: a central processing unit (CPU); a multi-processor unit (MPU); an ARM processor; a controller; a programmable logic device; or the like.

In the example embodiment, the one or more processors 1104 and the random access memory (RAM) 1106 form an interactive controller processing unit 1199. In some embodiments, interactive controller processing unit includes one or more processors operatively connected to one or more of a RAM, ROM, and machine-readable storage medium; the one or more processors of interactive controller processing unit receive instructions stored by the one or more of a RAM, ROM, and machine-readable storage medium via a bus; and the one or more processors execute the received instructions. In some embodiments, interactive controller processing unit is an ASIC (Application-Specific Integrated Circuit). In some embodiments, interactive controller processing unit is a SoC (System-on-Chip).

Examples of output devices 1112 include, but are not limited to, display screens; light panels; and/or lighted displays. In accordance with particular embodiments, the one or more processors 1104 are operatively connected to audio output devices such as, but not limited to: speakers; and/or sound amplifiers. In accordance with many of these embodiments, the one or more processors 1104 are operatively connected to tactile output devices like vibrators, and/or manipulators.

Examples of user input devices 1114 include, but are not limited to: tactile devices including but not limited to, keyboards, keypads, foot pads, touch screens, and/or trackballs; non-contact devices such as audio input devices; motion sensors and motion capture devices that interactive controller can use to receive inputs from a user when the user interacts with interactive controller; physiological sensors that monitor the physiology of the user; environmental sensors that monitor the physical environment of interactive controller; accelerometers that monitor changes in motion of interactive controller; and location sensors that monitor the location of interactive controller such as global positioning sensors.

The one or more communication interface devices 1116 provide one or more wired or wireless interfaces for communicating data and commands between interactive controller 400 and other devices that may be included in a modular interactive application interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface, a cellular or satellite telephone network interface; and the like.

The machine-readable storage medium 1110 stores machine-executable instructions for various components of interactive controller 1100, such as but not limited to: an operating system 1118; one or more device drivers 1122; wagering application instructions and data 1126; instructions and data for one or more application programs 1128 and 1130; and modular interactive application interleaved wagering system interactive controller instructions and data for use by the one or more processors 1104 to provide the features of an interactive controller as described herein.

In various embodiments, the machine-readable storage medium 1110 is one of a (or a combination of two or more of) a hard drive, a flash drive, a DVD, a CD, a flash storage, a solid state drive, a ROM, an EEPROM, and the like.

In operation, the machine-executable instructions are loaded into memory 1106 from the machine-readable storage medium 1110, the ROM 1108 or any other storage location. The respective machine-executable instructions are accessed by the one or more processors 1104 via the bus 1102, and then executed by the one or more processors 1104. Data used by the one or more processors 1104 are also stored in memory 1106, and the one or more processors 1104 access such data during execution of the machine-executable instructions. Execution of the machine-executable instructions causes the one or more processors 1104 to control interactive controller 400 to provide the features of a modular interactive application interleaved wagering system interactive controller as described herein Although an interactive controller is described herein as being constructed from or configured using one or more processors and instructions stored and executed by hardware components, interactive controller can be constructed from or configured using only hardware components in accordance with other embodiments. In addition, although the storage medium 1110 is described as being operatively connected to the one or more processors through a bus, those skilled in the art of interactive controllers will understand that the storage medium can include removable media such as, but not limited to, a USB memory device, an optical CD ROM, magnetic media such as tape and disks. In some embodiments, the storage medium 1110 can be accessed by the one or more processors 1104 through one of the communication interface devices 1116 or using a communication link. Furthermore, any of the user input devices or user output devices can be operatively connected to the one or more processors 1104 via one of the communication interface devices 1116 or using a communication link.

In some embodiments, an interactive controller can be distributed across a plurality of different devices. In many such embodiments, an interactive controller of a modular interactive application interleaved wagering system includes an interactive application server operatively connected to an interactive client using a communication link. Interactive application server and interactive application client cooperate to provide the features of an interactive controller as described herein.

In various embodiments, an interactive controller may be used to construct other components of a modular interactive application interleaved wagering system as described herein.

In some embodiments, components of an interactive controller and an application controller of a modular interactive application wagering interleaved system may be constructed from or configured using a single device using processes that communicate using an interprocess communication protocol. In other such embodiments, the components of an interactive controller and an application controller of a modular interactive application wagering interleaved system may communicate by passing messages, parameters or the like.

Figure 14:
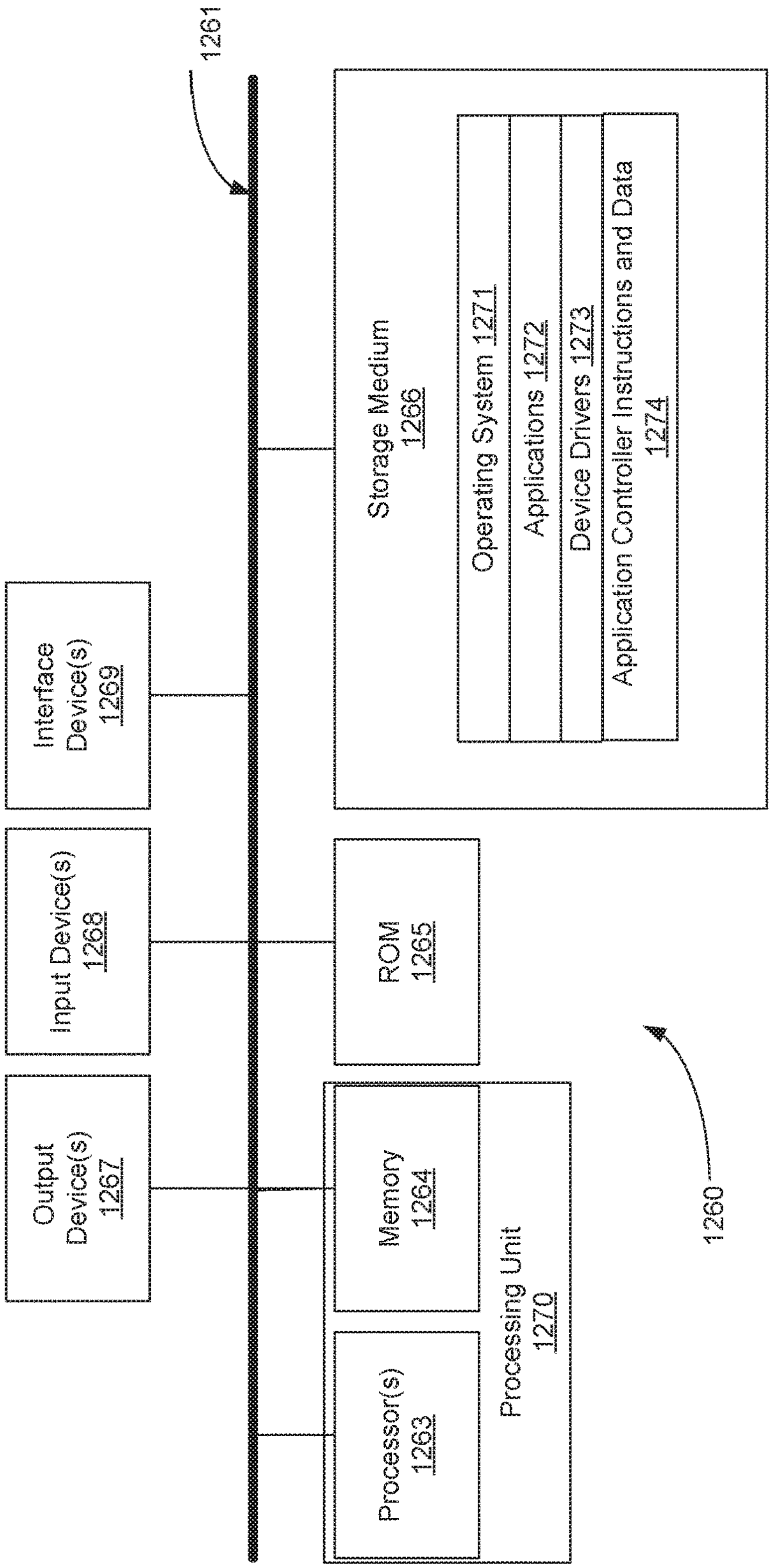
FIG. 14 is a diagram of a structure of an application controller of a modular interactive application interleaved wagering system in accordance with various embodiments of the invention.

FIG. 14 is a diagram of a structure of an application controller 1260 in accordance with various embodiments of the invention. An application controller may be constructed from or configured using one or more processing devices configured to perform the operations of application controller. In many embodiments, an application controller can be constructed from or configured using various types of processing devices including, but not limited to, a mobile device such as a smartphone, a personal digital assistant, a wireless device such as a tablet computer or the like, an electronic gaming machine, a personal computer, a gaming console, a set-top box, a computing device, a controller, or the like.

In many embodiments, an application controller 1260, suitable for use as an application controller of FIG. 1, manages operation of a modular interactive application interleaved wagering system, with a wager controller and an interactive controller being support units to application controller. Application controller provides an interface between interactive application, provided by an interactive controller, and a wagering proposition, provided by a wager controller.

In some embodiments, application controller includes an interactive controller interface to an interactive controller. Interactive controller interface provides for communication of data between an interactive controller and application controller, including but not limited to wager telemetry data, application instructions and resources, application telemetry data, and sensor telemetry data.

In various embodiments, application controller includes a wager controller interface to a wager controller. The wager controller interface provides for communication of data between application controller and a wager controller, including but not limited to wager outcomes and wager execution instructions.

In some embodiments, application controller includes a session/user management controller interface to a session/user management controller. The session/user management controller interface provides for communication of data between application controller and a session/user management controller, including but not limited to user session control data and user session telemetry data.

Application controller includes a rule-based decision subcontroller that receives telemetry data, such as application telemetry data and sensor telemetry data, from an interactive controller. The rule-based decision subcontroller uses the telemetry data, along with trigger logic to generate wager execution instructions used to trigger a wager in a wager controller.

In some embodiments, the application telemetry data includes, but is not limited to, application environment variables that indicate the state of an interactive application being used by a user, interactive controller data indicating a state of an interactive controller, and user actions and interactions between a user and an interactive application provided by an interactive controller. The wagering and/or wager execution instructions may include, but is not limited to, an amount and type of the wager, a trigger of the wager, and a selection of a paytable to be used when executing the wager.

In some embodiments, the rule-based decision subcontroller also receives wager outcome data from a wager controller. The decision subcontroller uses the wager outcome data, in conjunction with telemetry data and application logic to generate application decisions communicated to an application resource generator. The application resource generator receives the application decisions and uses the application decisions to generate application instructions and application resources to be communicated to an interactive application.

In many embodiments, application controller 1260 includes a pseudo random or random result generator used to generate random results that are communicated to the application resource generator. The application resource generator uses the random results to generate application instructions and application resources to be communicated to an interactive controller for use by an interactive application.

In various embodiments, the rule-based decision subcontroller also determines an amount of AC to award to a user based at least in part on the user's use of an interactive application of the modular interactive application interleaved wagering system as determined from application telemetry data. In some embodiments, wager outcome data may also be used to determine the amount of AC that should be awarded to the user.

In numerous embodiments, an interactive application is a skill-based interactive game and the AC is awarded to the user for the user's skillful play of the skill-based interactive game.

In some embodiments, the application decisions and wager outcome data are communicated to a wagering user interface generator. The wagering user interface generator receives the application decisions and wager outcome data and generates wager telemetry data describing the state of wagering and credit accumulation and loss for the modular interactive application interleaved wagering system. In some embodiments, the wager telemetry data may include, but is not limited to, amounts of AC and elements earned, lost or accumulated by the user through use of interactive application as determined from the application decisions, and Cr amounts won, lost or accumulated as determined from the wager outcome data and the one or more credit meters.

In some embodiments, the wager outcome data also includes data about one or more game states of a gambling game executed in accordance with a wagering proposition by a wager controller. In various such embodiments, the wagering user interface generator generates a gambling game process display and/or gambling game state display using the one or more game states of the gambling game. The gambling game process display and/or gambling game state display is included in wager telemetry data that is communicated to an interactive controller. The gambling game process display and/or a gambling game state display is displayed by a wagering user interface of interactive controller to a user. In other such embodiments, the one or more game states of the gambling game are communicated to an interactive controller and a wagering user interface of interactive controller generates a gambling game process display and/or gambling game state display using the one or more game states of the gambling game for display to a user.

Application controller 1260 can further operatively connect to a wager controller to determine an amount of credit or elements available and other wagering metrics of a wagering proposition. Thus, application controller may potentially affect an amount of Cr in play for participation in the wagering events of a gambling game provided by the wager controller. Application controller may additionally include various audit logs and activity meters. In some embodiments, application controller can also couple to a centralized server for exchanging various data related to the user and the activities of the user during game play of a modular interactive application interleaved wagering system.

In some embodiments, the operation of application controller 1260 does not affect the provision of a wagering proposition by a wager controller except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In a number of embodiments, communication of wager execution instructions between a wager controller and application controller 1260 can further be used to communicate various wagering control factors that the wager controller uses as input. Examples of wagering control factors include, but are not limited to, an amount of Cr, AC, elements, or objects consumed per wagering event, and/or the user's election to enter a jackpot round.

In some embodiments, application controller 1260 utilizes a wagering user interface to communicate certain interactive application data to the user, including but not limited to, club points, user status, control of the selection of user choices, and messages which a user can find useful in order to adjust interactive application experience or understand the wagering status of the user in accordance with the wagering proposition in the wager controller.

In some embodiments, application controller 1260 utilizes a wagering user interface to communicate aspects of a wagering proposition to the user including, but not limited to, odds of certain wager outcomes, amount of Cr, AC, elements, or objects in play, and amounts of Cr, AC, elements, or objects available.

In a number of embodiments, a wager controller can accept wager proposition factors including, but not limited to, modifications in the amount of Cr, AC, elements, or objects wagered on each individual wagering event, a number of wagering events per minute the wager controller can resolve, entrance into a bonus round, and other factors. In several embodiments, application controller 1260 can communicate a number of factors back and forth to the wager controller, such that an increase/decrease in a wagered amount can be related to the change in user profile of the user in interactive application. In this manner, a user can control a wager amount per wagering event in accordance with the wagering proposition with the change mapping to a parameter or component that is applicable to an interactive application experience.

Application controller 1260 includes a bus 1261 providing an interface for one or more processors 1263, random access memory (RAM) 1264, read only memory (ROM) 1265, machine-readable storage medium 1266, one or more user output devices 1267, one or more user input devices 1268, and one or more communication interface and/or network interface devices 1269.

The one or more processors 1263 may take many forms, such as, but not limited to: a central processing unit (CPU); a multi-processor unit (MPU); an ARM processor; a programmable logic device; or the like.

Examples of output devices 1267 include, include, but are not limited to: display screens; light panels; and/or lighted displays. In accordance with particular embodiments, the one or more processors 1263 are operatively connected to audio output devices such as, but not limited to: speakers; and/or sound amplifiers. In accordance with many of these embodiments, the one or more processors 1263 are operatively connected to tactile output devices like vibrators, and/or manipulators.

In the example embodiment, the one or more processors 1263 and the random access memory (RAM) 1264 form an application controller processing unit 1270. In some embodiments, application controller processing unit includes one or more processors operatively connected to one or more of a RAM, ROM, and machine-readable storage medium; the one or more processors of application controller processing unit receive instructions stored by the one or more of a RAM, ROM, and machine-readable storage medium via a bus; and the one or more processors execute the received instructions. In some embodiments, application controller processing unit is an ASIC (Application-Specific Integrated Circuit). In some embodiments, application controller processing unit is a SoC (System-on-Chip).

Examples of user input devices 1268 include, but are not limited to: tactile devices including but not limited to, keyboards, keypads, foot pads, touch screens, and/or trackballs; non-contact devices such as audio input devices; motion sensors and motion capture devices that application controller can use to receive inputs from a user when the user interacts with application controller 1260.

The one or more communication interface and/or network interface devices 1269 provide one or more wired or wireless interfaces for exchanging data and commands between application controller 1260 and other devices that may be included in a modular interactive application interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 1266 stores machine-executable instructions for various components of application controller 1260 such as, but not limited to: an operating system 1271; one or more applications 1272; one or more device drivers 1273; and modular interactive application interleaved wagering system application controller instructions and data 1274 for use by the one or more processors 1263 to provide the features of an application controller as described herein.

In various embodiments, the machine-readable storage medium 1270 is one of a (or a combination of two or more of) a hard drive, a flash drive, a DVD, a CD, a flash storage, a solid state drive, a ROM, an EEPROM, and the like.

In operation, the machine-executable instructions are loaded into memory 1264 from the machine-readable storage medium 1266, the ROM 1265 or any other storage location. The respective machine-executable instructions are accessed by the one or more processors 1263 via the bus 1261, and then executed by the one or more processors 1263. Data used by the one or more processors 1263 are also stored in memory 1264, and the one or more processors 1263 access such data during execution of the machine-executable instructions. Execution of the machine-executable instructions causes the one or more processors 1263 to control application controller 1260 to provide the features of a modular interactive application interleaved wagering system application controller as described herein.

Although application controller 1260 is described herein as being constructed from or configured using one or more processors and instructions stored and executed by hardware components, application controller can be composed of only hardware components in accordance with other embodiments. In addition, although the storage medium 1266 is described as being operatively connected to the one or more processors through a bus, those skilled in the art of application controllers will understand that the storage medium can include removable media such as, but not limited to, a USB memory device, an optical CD ROM, magnetic media such as tape and disks. Also, in some embodiments, the storage medium 1266 may be accessed by processor 1263 through one of the interfaces or using a communication link. Furthermore, any of the user input devices or user output devices may be operatively connected to the one or more processors 1263 via one of the interfaces or using a communication link.

In various embodiments, application controller 1260 may be used to construct other components of a modular interactive application interleaved wagering system as described herein.

In some embodiments, components of an interactive controller and an application controller of a modular interactive application wagering interleaved system may be constructed from or configured using a single device using processes that communicate using an interprocess communication protocol. In other such embodiments, the components of an interactive controller and an application controller of a modular interactive application wagering interleaved system may communicate by passing messages, parameters or the like.

Figure 15:
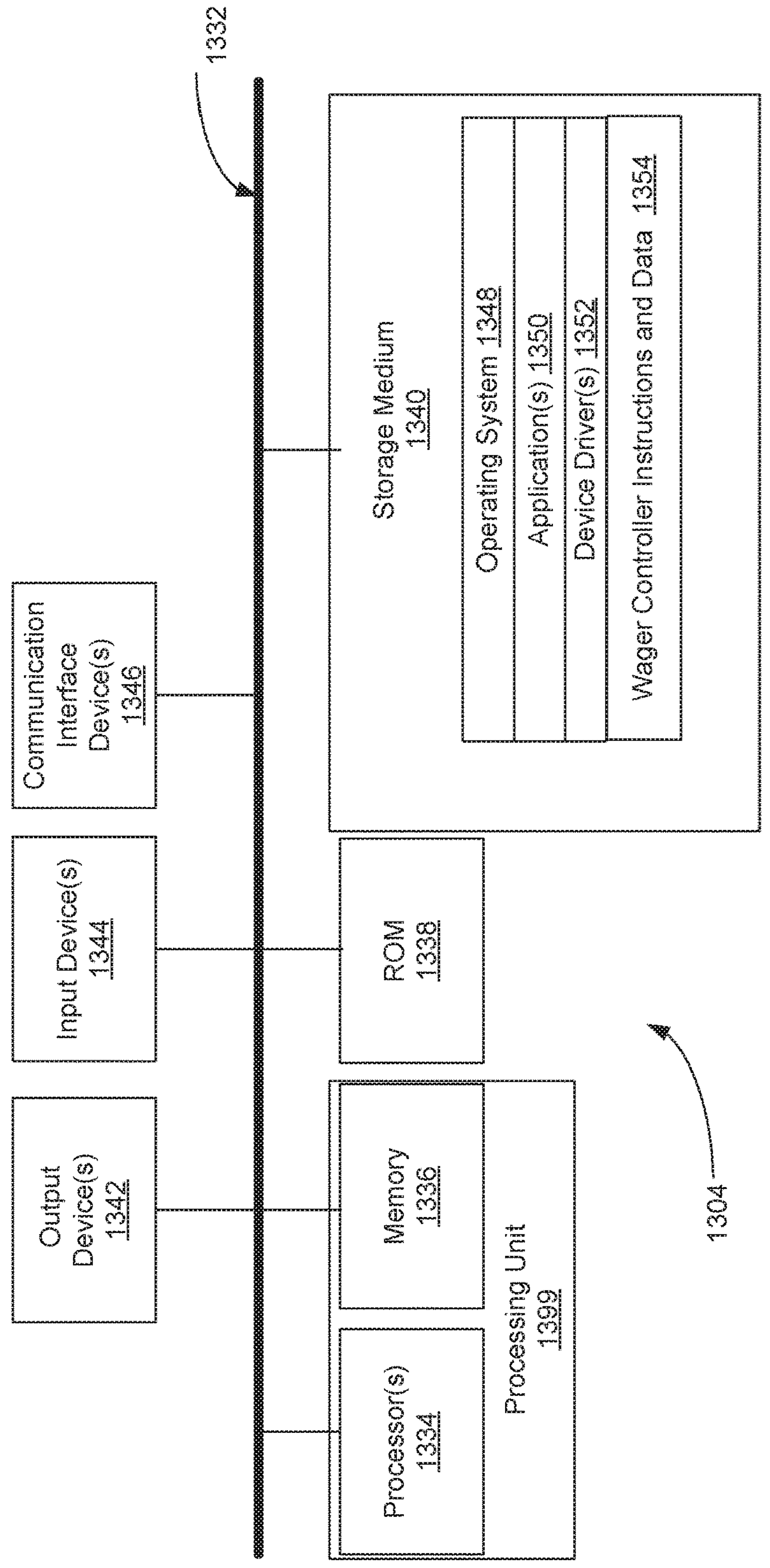
FIG. 15 is a diagram of a structure of wager controller of a modular interactive application interleaved wagering system in accordance with various embodiments of the invention.

FIG. 15 is a diagram of a structure of a wager controller 1304 of a modular interactive application interleaved wagering system in accordance with various embodiments of the invention. A wager controller may be constructed from or configured using one or more processing devices configured to perform the operations of the wager controller. In many embodiments, a wager controller can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Wager controller 1304, suitable for use as a wager controller of FIG. 1, includes one or more pseudorandom or random number generators (P/RNG) to produce random results or pseudo random results; one or more paytables which includes a plurality of factors indexed by the random result to be multiplied with an amount of Cr, AC, elements, or objects committed in a wager; and a wagering control module whose processes may include, but are not limited to, generating random results, looking up factors in the paytables, multiplying the factors by an amount of Cr, AC, elements, or objects wagered, and administering one or more Cr, AC, element, or object meters. The various wager controller components can interface with each other via an internal bus and/or other appropriate communication mechanism.

An interface allows the wager controller to operatively connect to an external device, such as one or more application controllers as described herein. The interface provides for receiving of wager execution instructions from the external device that is used to specify wager parameters and/or trigger execution of a wager by the wager controller. The interface may also provide for communicating wager outcome data to an external device. In numerous embodiments, the interface between the wager controller and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

In various embodiments, a wager controller may use a P/RNG provided by an external system. The external system may be connected to the wager controller by a suitable communication network such as a local area network (LAN) or a wide area network (WAN). In some embodiments, the external P/RNG is a central deterministic system that provides random or pseudo random results to one or more connected wager controllers.

During operation of the wager controller, the external system communicates wager execution instructions to the wager controller. The wager controller receives the wager execution instructions and uses the wager execution instructions to trigger execution of a wager in accordance with a wagering proposition. The wager controller executes the wager and determines a wager outcome for the wager. The wager controller communicates wager outcome data of the wager outcome to the external system.

In some embodiments, the wager controller uses the wager execution instructions to select a paytable to use and/or an amount of Cr, AC, elements, or objects to wager.

In some embodiments, the wager outcome data may include, but is not limited to, an amount of Cr, AC, elements, or objects won in the wager.

In various embodiments, the wager outcome data may include, but is not limited to, an amount of Cr, AC, elements, or objects in the one or more meters.

In some embodiments, the wager outcome data includes state data for the wagering proposition of the executed wager. The state data may correspond to one or more game states of a gambling game that is associated with the wagering proposition. Examples of state data include, but are not limited to, reel strips in an operation state or a final state for a reel-based gambling game, one or more dice positions for a dice-based gambling game, positions of a roulette wheel and roulette ball, position of a wheel of fortune, or the like.

In various embodiments, the wagering control module determines an amount of a wager and a paytable to use from the one or more paytables. In such embodiments, in response to the wager execution instructions triggering execution of the wager, the wager control module executes the wager by requesting a P/RNG result from the P/RNG; retrieving a paytable from the one or more paytables; adjusting the one or more credit meters for an amount of the wager; applying the P/RNG result to the retrieved paytable; multiplying the resultant factor from the paytable by an amount wagered to determine a wager outcome; updating the one or more meters based on the wager outcome; and communicating the wager outcome to the external device.

In various embodiments, an external system communicates a request for a P/RNG result from the wager controller. In response, the wager controller returns a P/RNG result as a function of an internal P/RNG or a P/RNG external to the external system to which the wager controller is operatively connected.

In some embodiments, a communication exchange between the wager controller and an external system relate to the external system support for coupling a P/RNG result to a particular paytable contained in the wager controller. In such an exchange, the external system communicates to the wager controller as to which of the one or more paytables to use, and requests a result whereby the P/RNG result would be associated with the requested paytable 623. The result of the coupling is returned to the external system. In such an exchange, no actual Cr, AC, element, or object wager is conducted, but might be useful in coupling certain non-value wagering interactive application behaviors and propositions to the same final resultant wagering return which is understood for the modular interactive application interleaved wagering system to conduct wagering.

In some embodiments, the wager controller may also include storage for statuses, wagers, wager outcomes, meters and other historical events in a storage device.

In some embodiments, an authorization access module provides a process to permit access and command exchange with the wager controller and access to the one or more credit meters for the amount of Cr, AC, elements, or objects being wagered by the user in the modular interactive application interleaved wagering system.

In numerous embodiments, communication occurs between various types of a wager controller and an external system, such as application controller. In some of these embodiments, the purpose of the wager controller is to allocate wagers to pools, detect occurrences of one or more events upon which the wagers were made, and determine the wager outcomes for each individual wager based on the number of winning wagers and the amount paid into the pool.

In some embodiments, the wager controller manages accounts for individual users wherein the users make deposits into the accounts, amounts are deducted from the accounts, and amounts are credited to the users' accounts based on the wager outcomes.

In some embodiments a wager controller is a pari-mutuel wagering system such as used for wagering on an events such as horse races, greyhound races, sporting events and the like. In a pari-mutuel wagering system, user's wagers on the outcome of an event are allocated to a pool. When the event occurs, wager outcomes are calculated by sharing the pool among all winning wagers.

In various embodiments, a wager controller is a central determination system, such as but not limited to a central determination system for a Class II wagering system or a wagering system in support of a "scratch off" style lottery. In such a wagering system, a player plays against other players and competes for a common prize. In a given set of wager outcomes, there are a certain number of wins and losses. Once a certain wager outcome has been determined, the same wager outcome cannot occur again until a new set of wager outcomes is generated.

In numerous embodiments, communication occurs between various components of a wager controller 604 and an external system, such as an application controller. In some of these embodiments, the purpose of the wager controller is to manage wagering on wagering events and to provide random (or pseudo random) results from a P/RNG.

Wager controller 1304 includes a bus 1332 that provides an interface for one or more processors 1334, random access memory (RAM) 1336, read only memory (ROM) 1338, machine-readable storage medium 1340, one or more user output devices 1342, one or more user input devices 1344, and one or more communication interface and/or network interface devices 1346.

The one or more processors 1334 may take many forms, such as, but not limited to, a central processing unit (CPU), a multi-processor unit (MPU), an ARM processor, a controller, a programmable logic device, or the like.

In the example embodiment, the one or more processors 1334 and the random access memory (RAM) 1336 form a wager controller processing unit 1399. In some embodiments, the wager controller processing unit includes one or more processors operatively connected to one or more of a RAM, ROM, and machine-readable storage medium; the one or more processors of the wager controller processing unit receive instructions stored by the one or more of a RAM, ROM, and machine-readable storage medium via a bus; and the one or more processors execute the received instructions. In some embodiments, the wager controller processing unit is an ASIC (Application-Specific Integrated Circuit). In some embodiments, the wager controller processing unit is a SoC (System-on-Chip).

Examples of output devices 1342 include, but are not limited to, display screens, light panels, and/or lighted displays. In accordance with particular embodiments, the one or more processors 1334 are operatively connected to audio output devices such as, but not limited to speakers, and/or sound amplifiers. In accordance with many of these embodiments, the one or more processors 1334 are operatively connected to tactile output devices like vibrators, and/or manipulators.

Examples of user input devices 1334 include, but are not limited to, tactile devices including but not limited to, keyboards, keypads, touch screens, and/or trackballs; non-contact devices such as audio input devices; motion sensors and motion capture devices that the wager controller can use to receive inputs from a user when the user interacts with the wager controller 604.

The one or more communication interface and/or network interface devices 1346 provide one or more wired or wireless interfaces for exchanging data and commands between the wager controller 1304 and other devices that may be included in a modular interactive application interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 1340 stores machine-executable instructions for various components of a wager controller, such as but not limited to: an operating system 1348; one or more application programs 1350; one or more device drivers 1352; and modular interactive application interleaved wagering system wager controller instructions and data 1354 for use by the one or more processors 1334 to provide the features of a modular interactive application interleaved wagering system wager controller as described herein.

In various embodiments, the machine-readable storage medium 1340 is one of a (or a combination of two or more of) a hard drive, a flash drive, a DVD, a CD, a flash storage, a solid state drive, a ROM, an EEPROM, and the like.

In operation, the machine-executable instructions are loaded into memory 1336 from the machine-readable storage medium 1340, the ROM 1338 or any other storage location. The respective machine-executable instructions are accessed by the one or more processors 1334 via the bus 1332, and then executed by the one or more processors 1334. Data used by the one or more processors 1334 are also stored in memory 1336, and the one or more processors 1334 access such data during execution of the machine-executable instructions. Execution of the machine-executable instructions causes the one or more processors 1334 to control the wager controller 1304 to provide the features of a modular interactive application interleaved wagering system wager controller as described herein Although the wager controller 1304 is described herein as being constructed from or configured using one or more processors and machine-executable instructions stored and executed by hardware components, the wager controller can be composed of only hardware components in accordance with other embodiments. In addition, although the storage medium 1340 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 1340 can be accessed by the one or more processors 1334 through one of the interfaces or using a communication link. Furthermore, any of the user input devices or user output devices can be operatively connected to the one or more processors 1334 via one of the interfaces or using a communication link.

In various embodiments, the wager controller 604 may be used to construct other components of a modular interactive application interleaved wagering system as described herein.

In some embodiments, components of a wager controller and an application controller of a modular interactive application wagering interleaved system may be constructed from or configured using a single device using processes that communicate using an interprocess communication protocol. In other such embodiments, the components of a wager controller and an application controller of a modular interactive application wagering interleaved system may communicate by passing messages, parameters or the like.

It should be understood that there may be many embodiments of a wager controller 1304 which could be possible, including forms where many modules and components of the wager controller are located in various servers and locations, so the foregoing is not meant to be exhaustive or all inclusive, but rather provide data on various embodiments of a wager controller 1304.

Figure 16:
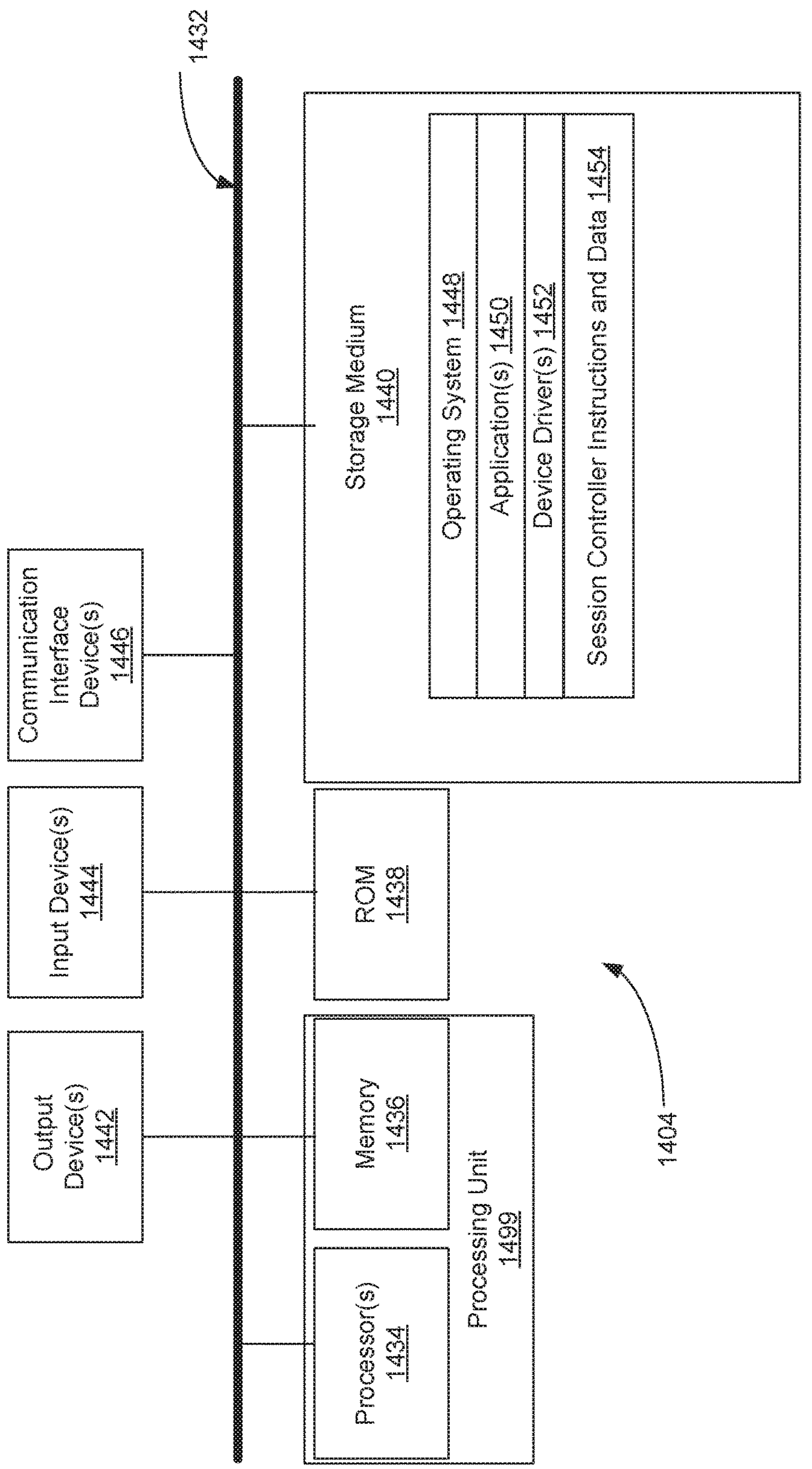
FIG. 16 is a diagram of a structure of a session/user management controller of a modular interactive application interleaved wagering system in accordance with various embodiments of the invention.

FIG. 16 is a diagram of a structure of a session/user management controller 1404 of a modular interactive application interleaved wagering system in accordance with various embodiments of the invention. A session/user management controller may be constructed from or configured using one or more processing devices configured to perform the operations of the session/user management controller. In many embodiments, a wager user session can be constructed from or configured using various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, a server, or the like.

A session/user management controller 1404, suitable for use as session/user management controller of FIG. 1, includes a user management and session control module whose processes may include, but are not limited to, registering users of a modular interactive application wagering interleaved system, validating users of a modular interactive application wagering interleaved system using user registration data, managing various types of user sessions for users of the modular interactive application wagering interleaved system, and the like.

The session/user management controller may further include a datastore storing user data used to manage user registration and validation. The session/user management controller may further include a datastore storing user session data used to manage one or more user sessions.

The various session/user management controller components can interface with each other via an internal bus and/or other appropriate communication mechanism.

An interface allows the session/user management controller to operatively connect to one or more external devices, such as one or more application controllers, wager controllers and/or interactive controllers as described herein. The interface provides for receiving session telemetry data from the one more external devices. The user session telemetry data includes, but is not limited to, amounts of AC earned by one or more users, requests for entering into a modular interactive application user session as described herein, and telemetry data regarding the progress of one or more users during a modular interactive application user session. The interface may also provide for communicating secession control data used to manage a user session.

In numerous embodiments, the interface between the session/user management controller and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

During operation of the session/user management controller, the external system communicates user session telemetry data to the session/user management controller. The session/user management controller receives the user session telemetry data and uses the user session telemetry data to generate user session control data as described herein. The session/user management controller communicates the user session control data to the external system.

The session/user management controller 1404 includes a bus 1432 that provides an interface for one or more processors 1434, random access memory (RAM) 1436, read only memory (ROM) 1438, machine-readable storage medium 1440, one or more user output devices 1442, one or more user input devices 1444, and one or more communication interface and/or network interface devices 1446.

The one or more processors 1434 may take many forms, such as, but not limited to, a central processing unit (CPU), a multi-processor unit (MPU), an ARM processor, a controller, a programmable logic device, or the like.

In the example embodiment, the one or more processors 1434 and the random access memory (RAM) 1436 form a session/user management controller processing unit 1499. In some embodiments, the session/user management controller processing unit includes one or more processors operatively connected to one or more of a RAM, ROM, and machine-readable storage medium; the one or more processors of the session/user management controller processing unit receive instructions stored by the one or more of a RAM, ROM, and machine-readable storage medium via a bus; and the one or more processors execute the received instructions. In some embodiments, the session/user management controller processing unit is an ASIC (Application-Specific Integrated Circuit). In some embodiments, the session/user management controller processing unit is a SoC (System-on-Chip).

Examples of output devices 1442 include, but are not limited to, display screens, light panels, and/or lighted displays. In accordance with particular embodiments, the one or more processors 1434 are operatively connected to audio output devices such as, but not limited to speakers, and/or sound amplifiers. In accordance with many of these embodiments, the one or more processors 1434 are operatively connected to tactile output devices like vibrators, and/or manipulators.

Examples of user input devices 1444 include, but are not limited to, tactile devices including but not limited to, keyboards, keypads, touch screens, and/or trackballs; non-contact devices such as audio input devices; motion sensors and motion capture devices that the session/user management controller can use to receive inputs from a user when the user interacts with the session/user management controller 1404.

The one or more communication interface and/or network interface devices 1446 provide one or more wired or wireless interfaces for exchanging data and commands between the session/user management controller 1404 and other devices that may be included in a modular interactive application interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 1440 stores machine-executable instructions for various components of a session/user management controller, such as but not limited to: an operating system 1448; one or more application programs 1450; one or more device drivers 1452; and modular interactive application interleaved wagering system session/user management controller instructions and data 1454 for use by the one or more processors 1434 to provide the features of a modular interactive application interleaved wagering system session/user management controller as described herein.

In various embodiments, the machine-readable storage medium 1440 is one of a (or a combination of two or more of) a hard drive, a flash drive, a DVD, a CD, a flash storage, a solid state drive, a ROM, an EEPROM, and the like.

In operation, the machine-executable instructions are loaded into memory 736 from the machine-readable storage medium 1440, the ROM 1438 or any other storage location. The respective machine-executable instructions are accessed by the one or more processors 1434 via the bus 1432, and then executed by the one or more processors 1434. Data used by the one or more processors 1434 are also stored in memory 1436, and the one or more processors 1434 access such data during execution of the machine-executable instructions. Execution of the machine-executable instructions causes the one or more processors 1434 to control the session/user management controller 1404 to provide the features of a modular interactive application interleaved wagering system session/user management controller as described herein Although the session/user management controller 1404 is described herein as being constructed from or configured using one or more processors and machine-executable instructions stored and executed by hardware components, the session/user management controller can be composed of only hardware components in accordance with other embodiments. In addition, although the storage medium 1440 is described as being operatively connected to the one or more processors through a bus, those skilled in the art of processing devices will understand that the storage medium can include removable media such as, but not limited to, a USB memory device, an optical CD ROM, magnetic media such as tape and disks. In some embodiments, the storage medium 1440 can be accessed by the one or more processors 1434 through one of the interfaces or using a communication link. Furthermore, any of the user input devices or user output devices can be operatively connected to the one or more processors 1434 via one of the interfaces or using a communication link.

In various embodiments, the session/user management controller 1404 may be used to construct other components of a modular interactive application interleaved wagering system as described herein.

In some embodiments, components of a session/user management controller and an application controller of a modular interactive application wagering interleaved system may be constructed from or configured using a single device using processes that communicate using an interprocess communication protocol. In other such embodiments, the components of a session/user management controller and an application controller of a modular interactive application wagering interleaved system may communicate by passing messages, parameters or the like.

In some embodiments, components of a session/user management controller and a wager controller of a modular interactive application wagering interleaved system may be constructed from or configured using a single device using processes that communicate using an interprocess communication protocol. In other such embodiments, the components of a session/user management controller and an application controller of a modular interactive application wagering interleaved system may communicate by passing messages, parameters or the like.

It should be understood that there may be many embodiments of a session/user management controller 1404 which could be possible, including forms where many modules and components of the session/user management controller are located in various servers and locations, so the foregoing is not meant to be exhaustive or all inclusive, but rather provide data on various embodiments of a session/user management controller 1404.

In numerous embodiments, any of a wager controller, an application controller, an interactive controller, or a session/user management controller as described herein can be constructed from or configured using multiple processing devices, whether dedicated, shared, or distributed in any combination thereof, or can be constructed from or configured using a single processing device. In addition, while certain aspects and features of modular interactive application interleaved wagering system processes described herein have been attributed to a wager controller, an application controller, an interactive controller, or a session/user management controller, these aspects and features can be provided in a distributed form where any of the features or aspects can be provided by any of a session/user management controller, a wager controller, an application controller, and/or an interactive controller within a modular interactive application interleaved wagering system without deviating from the spirit of the invention.

Although various components of modular interactive application interleaved wagering systems are discussed herein, modular interactive application interleaved wagering systems can be configured with any component as appropriate to the specification of a specific application in accordance with embodiments of the invention. In certain embodiments, components of a modular interactive application interleaved wagering system, such as a session/user management controller, an application controller, a wager controller, and/or an interactive controller, can be configured in different ways for a specific modular interactive application interleaved wagering system.

In some embodiments, components of a session/user management controller, an interactive controller, an application controller, and/or a wager controller of a modular interactive application wagering interleaved system may be constructed from or configured using a single device using processes that communicate using an interprocess communication protocol. In many embodiments, the components of a session/user management controller, an interactive controller, an application controller and a wager controller of a modular interactive application wagering interleaved system may communicate by passing messages, parameters or the like.

In addition, while certain aspects and features of modular interactive application interleaved wagering system processes described herein have been attributed to a session/user management controller, a wager controller, an application controller, or an interactive controller, these aspects and features can be provided in a distributed form where any of the features or aspects can be provided by any of a session/user management controller, a wager controller, an application controller, and/or an interactive controller within a modular interactive application interleaved wagering system.

While the above description may include many specific embodiments of the invention, these should not be construed as limitations on the scope of the invention, but rather as examples of embodiments thereof. It is therefore to be understood that the present invention can be practiced otherwise than specifically described, without departing from the scope and spirit of the present invention. Thus, embodiments of the present invention described herein should be considered in all respects as illustrative and not restrictive.

What is claimed:

1. A modular interactive application interleaved wagering system, comprising:

an interactive controller constructed to:

provide a skill-based interactive game in which a user interacts with application resources;

generate a visual display of a user interface of a wagering application using a display output device;

generate a visual display of a user interface of the skill-based interactive game using the display output device;

combine the user interface of the wagering application and the user interface of the skill-based interactive game into a combined user interface displayed to a user using the display output device;

detect user interactions with the combined user interface and distribute the user interactions to an application controller;

receive from the application controller a wager outcome;

modify the skill-based interactive game by incorporating application resource instructions;

and display to the user using the wagering user interface of the combined user interface, the wager outcome using the display output device; and an application controller operatively connecting the interactive controller to a wager controller, wherein the application controller is constructed to:

receive from the interactive controller, the user interactions;

detect a wagering event based on the user interacting with the application resources within the skill-based interactive game;

determine the wager outcome responsive to the wagering event using the wager controller including a random number generator;

distribute the wager event to the interactive controller;

generate application resource instructions based on the wager outcome; and distribute the application resource instructions to the interactive controller.

2. The modular interactive application interleaved wagering system of claim 1, wherein interactive controller and application controller are constructed from the same device, and wherein application controller is operatively connected to the wager controller using a communication link.

3. The modular interactive application interleaved wagering system of claim 1, wherein the wager controller and application controller are constructed from the same device, and wherein the application controller is operatively connected to interactive controller using a communication link.

4. The modular interactive application interleaved wagering system of claim 1, further comprising:

an enclosure constructed to mount:

a user input device operatively connected to the interactive controller;

the display output device operatively connected to the interactive controller;

a credit input device operatively connected to the wager controller; and a credit output device operatively connected to the wager controller.

5. The modular interactive application interleaved wagering system of claim 4, wherein the wager controller is further constructed to:

communicate with the credit input device to receive a credit input, the credit input for wagering to determine the wager outcome;

generate the wager outcome based on a random result generated by the random number generator; and update a credit meter based on the wager outcome.

* * * * *